(12) United States Patent
Kusaka

(10) Patent No.: US 7,863,550 B2
(45) Date of Patent: Jan. 4, 2011

(54) FOCUS DETECTION DEVICE AND FOCUS DETECTION METHOD BASED UPON CENTER POSITION OF GRAVITY INFORMATION OF A PAIR OF LIGHT FLUXES

(75) Inventor: Yosuke Kusaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 166 days.

(21) Appl. No.: 12/081,481

(22) Filed: Apr. 16, 2008

(65) Prior Publication Data

US 2008/0258039 A1 Oct. 23, 2008

(30) Foreign Application Priority Data

Apr. 18, 2007 (JP) ............................. 2007-109055

(51) Int. Cl.
G01B 9/04 (2006.01)
G06M 7/00 (2006.01)
(52) U.S. Cl. .................................... 250/201.8; 250/221
(58) Field of Classification Search ... 250/201.1–201.9, 250/221; 359/383; 348/345, 347, 349, 350, 348/353; 396/80, 82
See application file for complete search history.

(56) References Cited

U.S. PATENT DOCUMENTS

| | | | |
|---|---|---|---|
| 4,346,970 A * | 8/1982 | Kawabata et al. ............. | 396/92 |
| 4,500,778 A | 2/1985 | Kusaka et al. | |
| 4,851,657 A * | 7/1989 | Taniguchi et al. ......... | 250/201.7 |
| 5,059,999 A | 10/1991 | Matsuzawa | |
| 5,536,931 A * | 7/1996 | Kusaka et al. ............. | 250/201.8 |
| 5,659,813 A * | 8/1997 | Kusaka et al. ................ | 396/111 |
| 7,231,143 B2 * | 6/2007 | Toji ............................ | 396/111 |

FOREIGN PATENT DOCUMENTS

| | | |
|---|---|---|
| JP | A-55-127505 | 10/1980 |
| JP | A-57-093326 | 6/1982 |
| JP | A-57-165806 | 10/1982 |
| JP | A-62-100718 | 5/1987 |
| JP | A-01-237610 | 9/1989 |
| JP | A-02-272510 | 11/1990 |

* cited by examiner

Primary Examiner—Georgia Y Epps
Assistant Examiner—Pascal M Bui-Pho
(74) Attorney, Agent, or Firm—Oliff & Berridge, PLC

(57) ABSTRACT

A focus detection device comprises: an image shift detection unit that detects a relative shift amount of a pair of images formed by a pair of light fluxes having passed through an optical system; and a conversion unit that converts the shift amount to a defocus amount based upon dimensional information of an exit pupil corresponding to an aperture restricting light flux in the optical system and distance information of the exit pupil indicating distance to the exit pupil from a predetermined imaging plane of the optical system.

15 Claims, 22 Drawing Sheets

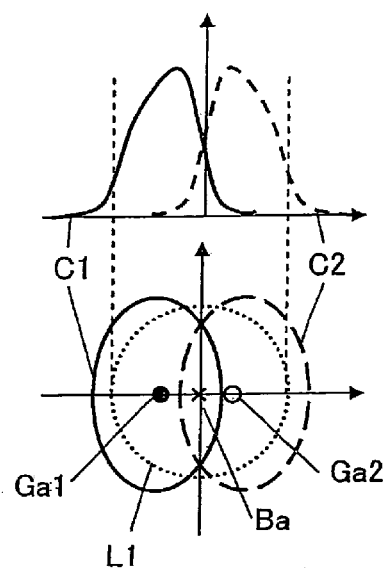
FIG.13A-1
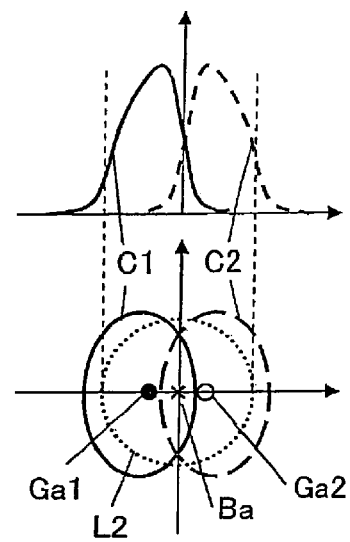
FIG.13A-2
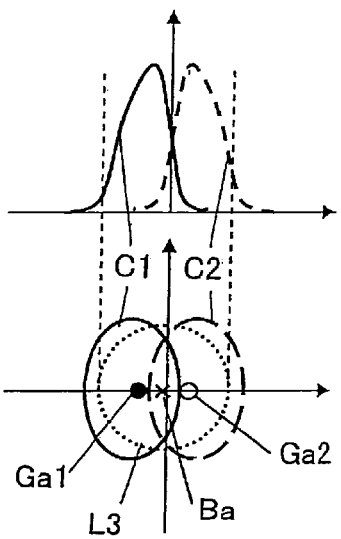
FIG.13A-3
FIG.13C
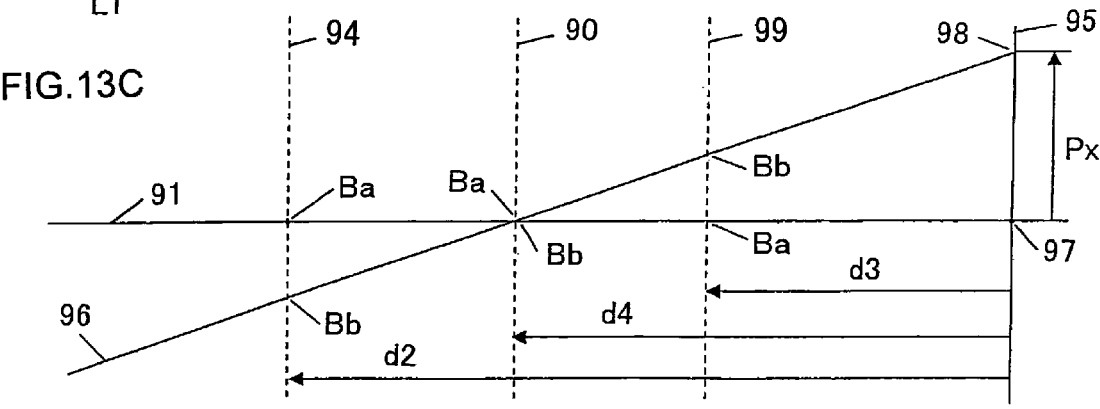
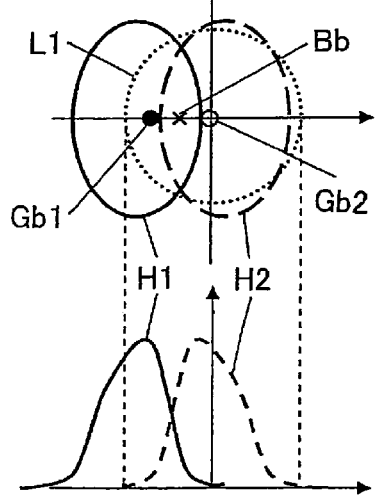
FIG.13B-1
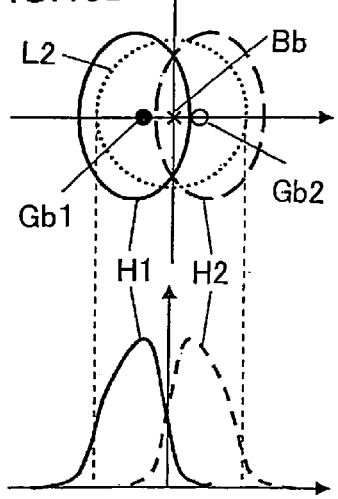
FIG.13B-2
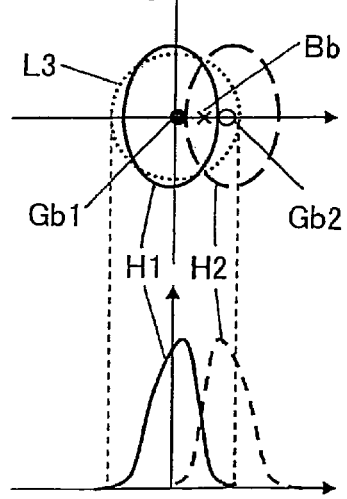
FIG.13B-3

16    10
 \_____/
   313

10    17
 \_____/
   314

FOCUS DETECTION DEVICE AND FOCUS DETECTION METHOD BASED UPON CENTER POSITION OF GRAVITY INFORMATION OF A PAIR OF LIGHT FLUXES

INCORPORATION BY REFERENCE

The disclosure of the following priority application is herein incorporated by reference: Japanese Patent Application No. 2007-109055 filed Apr. 18, 2007

BACKGROUND OF THE INVENTION

1. Field of the Invention

The present invention relates to a focus detection device, a focus detection method and an imaging apparatus.

2. Description of Related Art

Japanese Laid Open Patent Application No. S57-165806 discloses a focus detection device adopting a split-pupil phase difference detection method. Such a focus detection device converts the extent of relative offset manifested by a pair of images formed with focus detection light fluxes having passed through a pair of areas at an exit pupil of an imaging optical system a defocus amount indicating the extent of defocusing manifested by the imaging optical system by using a specific conversion expression.

SUMMARY OF THE INVENTION

However, the conversion expression used in the focus detection device in the related art described above assumes that the pair of focus detection light fluxes are not blocked by the aperture at the imaging optical system or a lens opening, i.e., that the pair of focus detection light fluxes are not vignetted. For this reason, if the pair of focus detection light fluxes are actually vignetted by the aperture at the imaging optical system or a lens opening, the defocus amount obtained as the conversion result is bound to contain a significant error.

A focus detection device according to the first embodiment of the invention comprises: an image shift detection unit that detects a relative shift amount of a pair of images formed by a pair of light fluxes having passed through an optical system; and a conversion unit that converts the shift amount to a defocus amount based upon dimensional information of an exit pupil corresponding to an aperture restricting light flux in the optical system and distance information of the exit pupil indicating distance to the exit pupil from a predetermined imaging plane of the optical system.

According to the second aspect of the invention, it is preferred that the focus detection device according to the first aspect further comprises a gravitational center information output unit that outputs a center position of gravity of at least one of the light fluxes in the pair of light fluxes included in the light flux restricted by the exit pupil on a plane on which the exit pupil is set, based upon the dimensional information and the distance information of the exit pupil; and in this focus detection device the conversion unit converts the shift amount to the defocus amount based upon the dimensional information and the distance information of the exit pupil.

According to the third aspect of the invention, it is preferred that in the focus detection device according to the second aspect, the gravitational center information output unit outputs the center position of gravity information in correspondence to each pair of light fluxes; and the conversion unit converts a sum of the shift amount to the defocus amount, the sum of the shift amount being calculated in correspondence to each pair of light fluxes based upon the center position of gravity information and the distance information of the exit pupil.

According to the forth aspect of the invention, it is preferred that in the focus detection device according to the second aspect, the conversion unit converts the shift amount to the defocus amount based upon a proportional relation between the defocus amount relative to the shift amount at the predetermined imaging plane and a distance from an image forming plane to the plane on which the exit pupil is set relative to a distance from the center position of gravity at the plane on which the exit pupil is set to a center position of distribution of the pair of light fluxes.

According to the fifth aspect of the invention, it is preferred that the focus detection device according to the second aspect further comprises: a detection point positional information output unit that outputs positional information indicating a position of the detection point at which the defocus amount is detected, and in the focus detection device the gravitational center information output unit outputs the center position of gravity of at least one of the light fluxes in the pair of light fluxes included in the light flux restricted by the exit pupil on a plane on which the exit pupil is set, based upon the distance information of the exit pupil, the dimensional information of the exit pupil and the positional information outputted by the detection point positional information output unit.

According to the sixth aspect of the invention, it is preferred that the focus detection device according to the second aspect further comprises: a light quantity distribution information output unit that outputs light quantity distribution information indicating light quantity distributions in at least one of the light fluxes on the plane on which the exit pupil is set, and in the focus detection device the gravitational center information output unit may output the center position of gravity of at least one of the light fluxes in the pair of light fluxes included in the light flux restricted by the exit pupil on a plane on which the exit pupil is set, based upon the distance information of the exit pupil, the dimensional information of the exit pupil and the light quantity distribution information.

According to the seventh aspect of the invention, it is preferred that the focus detection device according to the second aspect further comprises: a detection point positional information output unit that outputs positional information indicating a position of the detection point at which the defocus amount is detected; and a light quantity distribution information output unit that outputs light quantity distribution information indicating light quantity distributions in at least one of the light fluxes on the plane on which the exit pupil is set, and in the focus detection device the gravitational center information output unit may output a center position of gravity of at least one of the light fluxes in the pair of the light fluxes included in the light flux restricted by the exit pupil on a plane on which the exit pupil is set, based upon the distance information of the exit pupil, the dimensional information of the exit pupil, the positional information and the light quantity distribution information.

According to the eighth aspect of the invention, it is preferred that in the focus detection device according to the first aspect, a dimension of the aperture in the optical system is defined by an aperture stop diameter, a lens diameter and an inner diameter of a lens holding member.

According to the ninth aspect of the invention, it is preferred that in the focus detection device according to the second aspect, the gravitational center information output unit outputs the center position of gravity in correspondence to each image shift detection unit.

According to the tenth aspect of the invention, it is preferred that the focus detection device according to the second aspect further comprises: an error detection unit that detects an error manifested with regard to the defocus amount based on a defocus amount provided by the conversion unit through conversion executed after driving the optical system based upon the defocus amount, and in the focus detection device the gravitational center information output unit may output the center position of gravity corrected in correspondence to the error.

According to the eleventh aspect of the invention, it is preferred that in the focus detection device according to the first aspect the image shift detection unit includes an array of focus detection pixels each equipped with a minute optical element and a photoelectric conversion unit disposed rearward relative to the minute optical element and detects the shift amount based upon an output from the focus detection pixels.

According to the twelfth aspect of the invention, it is preferred that in the focus detection device according to the tenth aspect the image shift detection unit generates a pair of signal data strings constituted with a first signal data string and a second signal data string from the output from the focus detection pixels; the image shift detection unit generates first arithmetic operation data by multiplying first data in the first signal data string by data samples near second data in the second signal data string corresponding to the first data and generates second arithmetic operation data by multiplying the second data in the second signal data string by data sampled near the first data in the first signal data string; and the image shift detection unit detects the shift amount by determining through arithmetic operation a level of correlation between the first arithmetic operation data and the second arithmetic operation data.

An imaging apparatus according to the thirteenth aspect of the invention comprises the focus detection device according to the first aspect.

A focus detection device according to the fourteenth aspect of the invention comprises: an image shift detection unit that detects a relative shift amount of a pair of images formed by a pair of light fluxes having passed through an optical system; a gravitational center information output unit that outputs a center position of gravity of each pair of the light fluxes in a light flux restricted by an aperture corresponding to an exit pupil on a plane on which the exit pupil is set; and a conversion unit that converts a sum of shift amounts to the defocus amount, the sum of the shift amount being calculated in correspondence to each pair of light fluxes based upon the center position of gravity information and the distance information of the exit pupil.

A focus detection device according to the fifteenth aspect of the invention comprises: an image shift detection unit that detects relative shift amount of a pair of images formed by a pair of light fluxes having passed through an optical system; a gravitational center information output unit that outputs a center position of gravity of at least one of the light fluxes in the pair of light fluxes included in the light flux restricted by an aperture corresponding to an exit pupil on a plane on which the exit pupil is set; and a conversion unit that converts the shift amount to a defocus amount based upon a proportional relation between the defocus amount relative to the shift amount at the predetermined imaging plane in the optical system and a distance from an image forming plane to the plane on which the exit pupil is set relative to a distance from the center position of gravity at the plane on which the exit pupil is set to a center position of distribution of the pair of light fluxes.

A focus detection method according to the sixteenth aspect of the invention comprises: detecting a relative shift amount of a pair of images formed by a pair of light fluxes having passed through an optical system; and converting the shift amount to a defocus amount based upon a dimensional information of exit pupil corresponding to an aperture restricting light flux in the optical system and distance information of the exit pupil from a predetermined imaging plane of the optical system.

According to the seventeenth aspect of the invention, it is preferred that the focus detection method according to the sixteenth aspect further comprises: outputting a center position of gravity of at least one of the light fluxes in the pair of light fluxes included in the light flux restricted by the exit pupil on a plane on which the exit pupil is set, based upon the dimensional information and the distance information of the exit pupil; and in the focus detection method the shift amount determined based upon the center position of gravity and the distance information of the exit pupil is converted to the defocus amount in a step of converting the image shift amount to the defocus amount.

According to the eighteenth aspect of the invention, it is preferred that in the focus detection method according to the seventeenth aspect the center position of gravity information is output in correspondence to each pair of light fluxes in a step of outputting the center position of gravity; and a sum of the shift amount is converted to the defocus amount in a step of converting the shift amount to the defocus amount, the sum of the shift amount being calculated in correspondence to each pair of light fluxes based upon the center position of gravity information and the distance information of the exit pupil.

According to the nineteenth aspect of the invention, it is preferred that in the focus detection method according to the seventeenth aspect the shift amount is converted to the defocus amount based upon a proportional relation between the defocus amount relative to the shift amount at the predetermined imaging plane and a distance from an image forming plane to the plane on which the exit pupil is set relative to a distance from the center position of gravity at the plane on which the exit pupil is set to a center position of distribution of the pair of light fluxes in a step of converting the shift amount to the defocus amount.

According to the twentieth aspect of the invention, it is preferred that the focus detection method according to the seventeenth aspect further comprises: outputting position information indicating a position at which the defocus amount is detected, and in the focus detection method, outputting a center position of gravity of at least one of the light fluxes in the pair of light fluxes included in the light flux restricted by the exit pupil on a plane on which the exit pupil is set based upon the dimensional information, the distance information and the position information in a step of outputting the center position of gravity.

According to the twenty-first aspect of the invention, it is preferred that the focus detection method according to the seventeenth aspect further comprises: outputting light quantity distribution information indicating light quantity distributions of the light fluxes on the plane on which the exit pupil is set, and in the focus detection method a center position of gravity of at least one of the light fluxes in the pair of light fluxes included in the light flux restricted by the exit pupil on a plane on which the exit pupil is set is output, based upon the dimensional information of the exit pupil, the distance information of the exit pupil and the light quantity distribution information in a step of outputting the center position of gravity.

According to the twenty-second aspect of the invention, it is preferred that the focus detection method according to the seventeenth aspect further comprises: outputting a detection point positional information indicating a position of detection point at which the defocus amount is detected; and outputting light quantity distribution information indicating light quantity distributions of the light fluxes on the plane on which the exit pupil is set, and in the focus detection method a center position of gravity of at least one of the light fluxes in the pair of light fluxes included in the light flux restricted by the exit pupil on a plane on which the exit pupil is set is output, based upon the dimensional information of the exit pupil, the distance information of the exit pupil, the position information and the light quantity distribution information in a step of outputting the center position of gravity.

A focus detection method according to the twenty-third aspect of the invention comprises: detecting a relative shift amount of a pair of images formed by a pair of light fluxes having passed through an optical system; outputting a center position of gravity of at least one of the light fluxes in the pair of light fluxes included in the light flux restricted by an aperture corresponding to an exit pupil on a plane on which an exit pupil is set; and converting the shift amount to the defocus amount based upon a proportional relation between the defocus amount relative to the shift amount at the predetermined imaging plane and a distance from an image forming plane to the plane on which the exit pupil is set relative to a distance from the center position of gravity at the plane on which the exit pupil is set to a center position of distribution of the pair of light fluxes.

BRIEF DESCRIPTION OF THE DRAWINGS

FIGS. 13A-1 through 13C illustrate how the focus detection light fluxes may become vignetted;

DESCRIPTION OF PREFERRED EMBODIMENT

Figure 1:
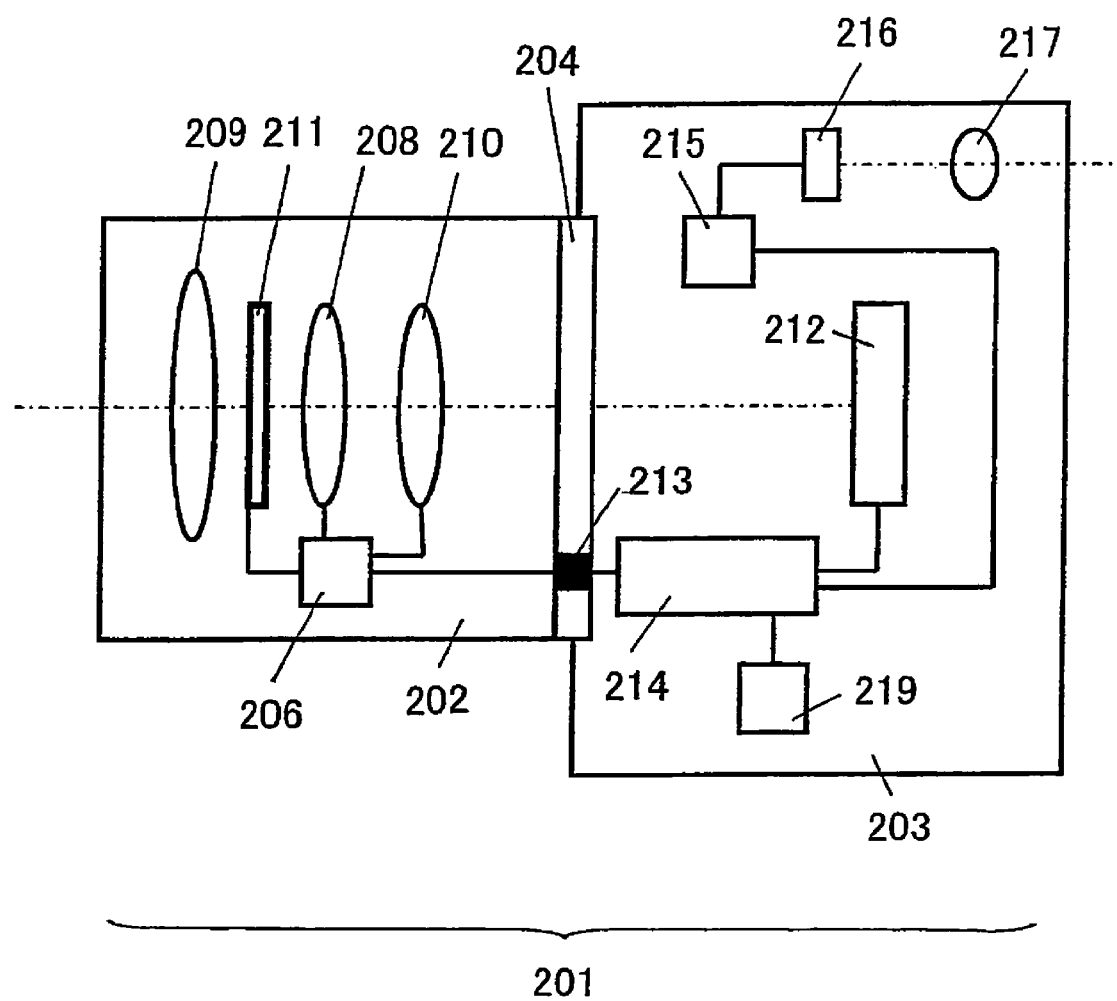
FIG. 1 is a lateral sectional view of the structure adopted in the camera achieved in an embodiment.

A digital still camera used in conjunction with interchangeable lenses, representing an example of an imaging apparatus equipped with the focus detection device achieved in an embodiment of the present invention is now explained. FIG. 1 is a lateral sectional view of the structure adopted in the camera in the embodiment. A digital still camera 201 achieved in the embodiment comprises an interchangeable lens 202 and a camera body 203. The interchangeable lens 202 is mounted at the camera body 203 via a mount unit 204.

The interchangeable lens 202 includes a zooming lens 208, a focusing lens 210, an aperture 211, a lens drive control device 206 and the like. The lens drive control device 206 is constituted with a microcomputer, a memory, a drive control circuit and the like (none shown). The lens drive control device 206 engages in communication with a body drive control device 214 to be detail later to transmit lens information to the body drive control device and receive camera information from the body drive control device, as well as executing drive control to adjust the focus of the focusing lens 210 and adjust the opening diameter at the aperture 211 and detecting the states of the zooming lens 208, the focusing lens 210 and the aperture 211. The aperture 211 forms an opening with an adjustable diameter centered on the optical axis in order to adjust the light quantity and the extent of blur.

An image sensor 212, the body drive control device 214, a liquid crystal display element drive circuit 215, a liquid crystal display element 216, an eyepiece lens 217, a memory card 219 and the like are disposed at the camera body 203. Imaging pixels are two-dimensionally arrayed at the image sensor 212 and focus detection pixels are also built into the image sensor over areas corresponding to focus detection points.

The body drive control device 214 comprises a microcomputer, a memory, a drive control circuit and the like. The body drive control device 214 repeatedly executes drive control of the image sensor 212, reads out image signals and focus detection signals, executes focus detection calculation based upon the focus detection signals and adjusts the focus in the interchangeable lens 202. It also processes the image signals, records the processed image signals, controls camera operations and the like. In addition, the body drive control device 214 engages in communication with the lens drive control device 206 via an electrical contact point 213 to receive the lens information and transmit the camera information (indicating the defocus amount, the aperture value and the like).

The liquid crystal display element 216 functions as a liquid crystal viewfinder (EVF: electronic viewfinder). A through image provided by the image sensor 212, brought up on display at the liquid crystal display element 216 by the liquid crystal display element drive circuit 215, can be observed by the photographer via the eyepiece lens 217. The memory card 219 is an image storage medium in which an image captured by the image sensor 212 is stored.

A subject image is formed on the light receiving surface of the image sensor 212 with a light flux having passed through the interchangeable lens 202. The subject image undergoes photoelectric conversion at the image sensor 212 and subsequently, image signals and focus detection signals are transmitted to the body drive control device 214.

The body drive control device 214 calculates the defocus amount indicating the extent of defocusing based upon focus detection signals output from the focus detection pixels at the image sensor 212 and transmits this defocus amount to the lens drive control device 206. In addition, the body drive control device 214 processes the image signals provided from the image sensor 212 and stores the processed image signals into the memory card 219. It also provides through image signals from the image sensor 212 to the liquid crystal display element drive circuit 215 so as to bring up a through image on display at the liquid crystal display element 216. Moreover, the body drive control device 214 provides aperture control information to the lens drive control device 206 to enable control of the aperture 211.

The lens drive control device 206 adjusts the lens information in correspondence to the current focusing state, zooming state and aperture setting state, the full-aperture and the like. More specifically, the lens drive control device 206 detects the positions of the zooming lens 208 and the focusing lens 210 and the aperture value set for the aperture 211, and calculates correct lens information based upon the lens positions and the aperture value. Alternatively, it may select the lens information corresponding to the lens positions and the aperture value from a lookup table prepared in advance.

In addition, the lens drive control device 206 calculates a lens drive amount indicating the extent to which the lens is to be driven based upon the defocus amount having been received and drives the focusing lens 210 to a focusing position based upon the lens drive amount. In addition, the lens drive control device 206 drives the aperture 211 in correspondence to the aperture value it has received.

Interchangeable lenses 202 equipped with various imaging optical systems can be mounted at the camera body 203 via the mount unit 204 and the camera body 203 detects the state of focus adjustment of the interchangeable lens 202 currently mounted thereat based upon the output from the focus detection pixels built into the image sensor 212.

Figure 2:
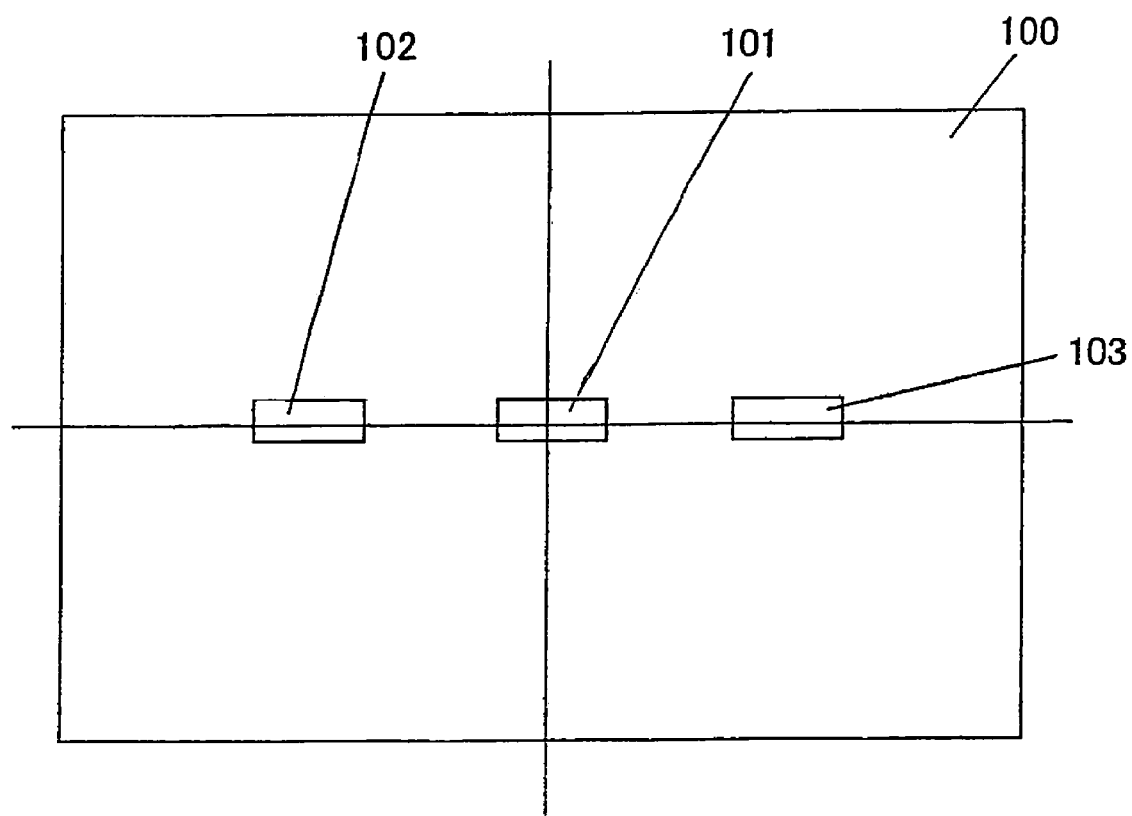
FIG. 2 shows the focus detection points set on the photographic image plane in the embodiment.

FIG. 2 shows focus detection points each indicating an area (focus detection area or a focus detection point) at which an image is sampled on the photographic image plane along a focus detection pixel row for purposes of focus detection, set on the photographic image plane in the embodiment. Three focus detection areas 101 through 103 are set in the embodiment, one at the center of the photographic image plane 100 and one each to the left and to the right relative to the center in the photographic image plane 100. Focus detection pixels are arrayed along a straight line along the longer side of each of the focus detection areas indicated as rectangular areas. The photographer manually selects a single focus detection area among the plurality of focus detection areas in correspondence to the image composition.

Figure 3:
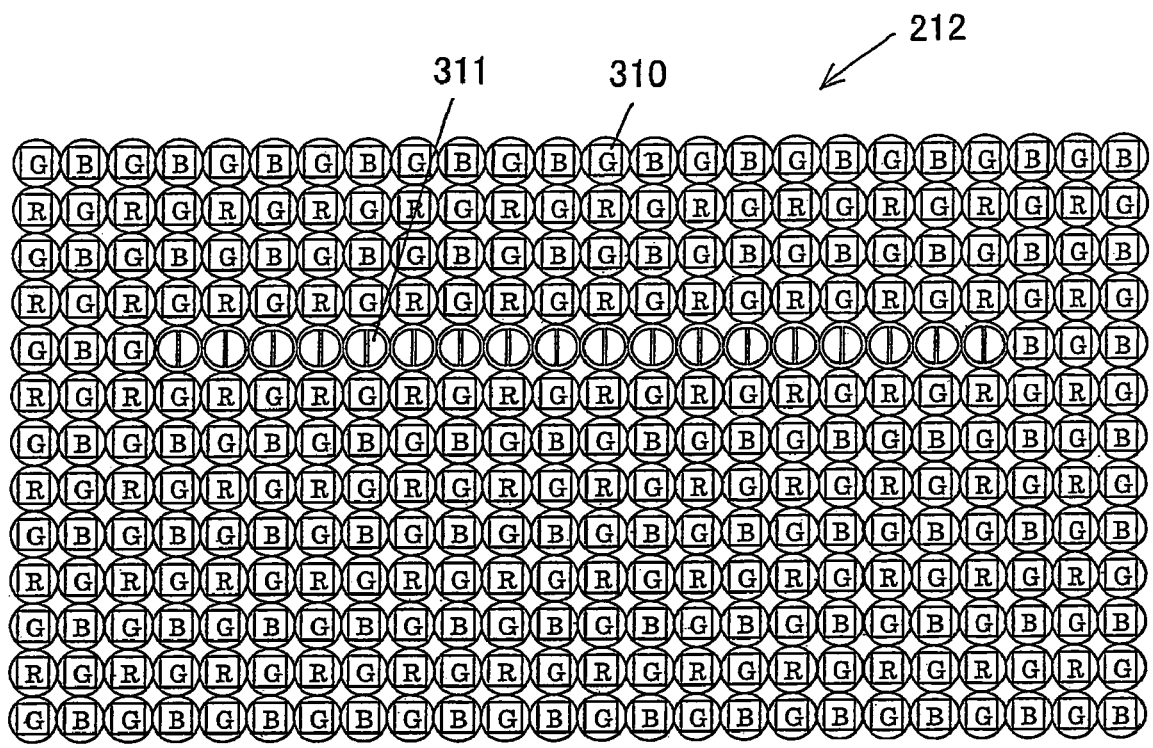
FIG. 3 is a front view showing the structure of the image sensor in detail.

FIG. 3 is a front view showing in detail the structure adopted in the image sensor 212, in an enlargement of the vicinity of one of the focus detection areas on the image sensor 212. The image sensor 212 is constituted with imaging pixels 310 and focus detection pixels 311.

Figure 4:
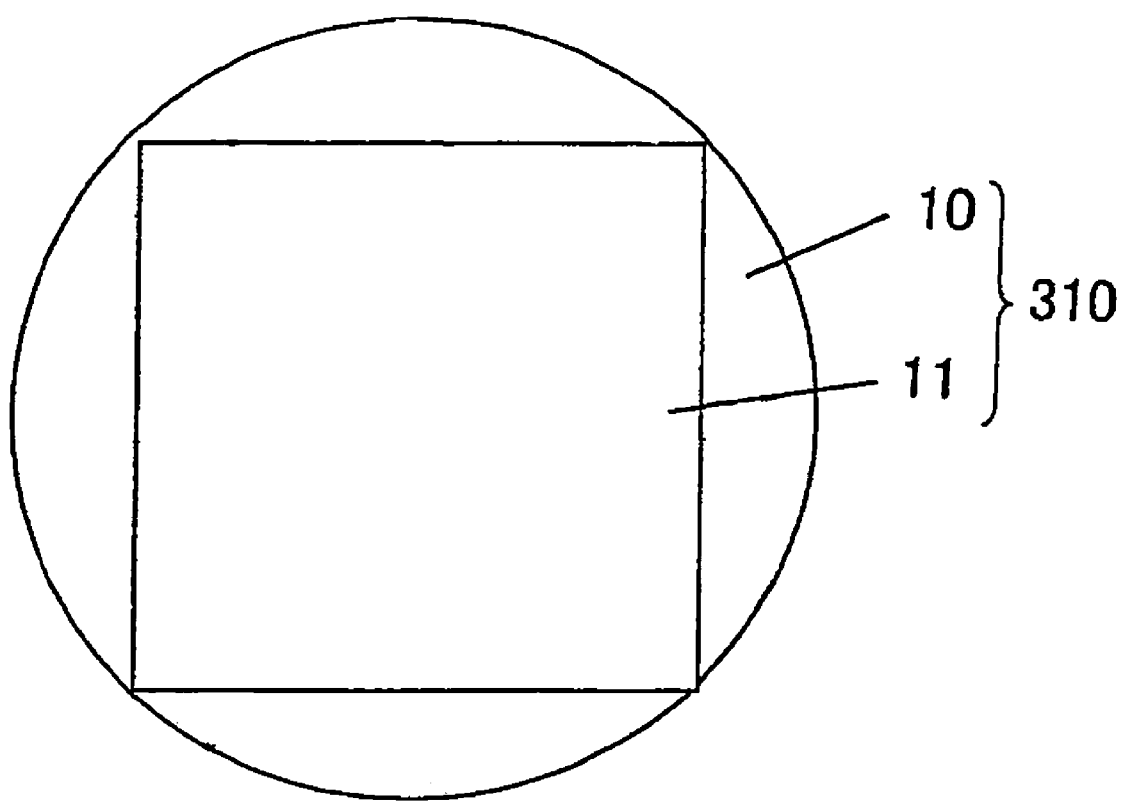
FIG. 4 is a front view of an imaging pixel.
Figure 6:
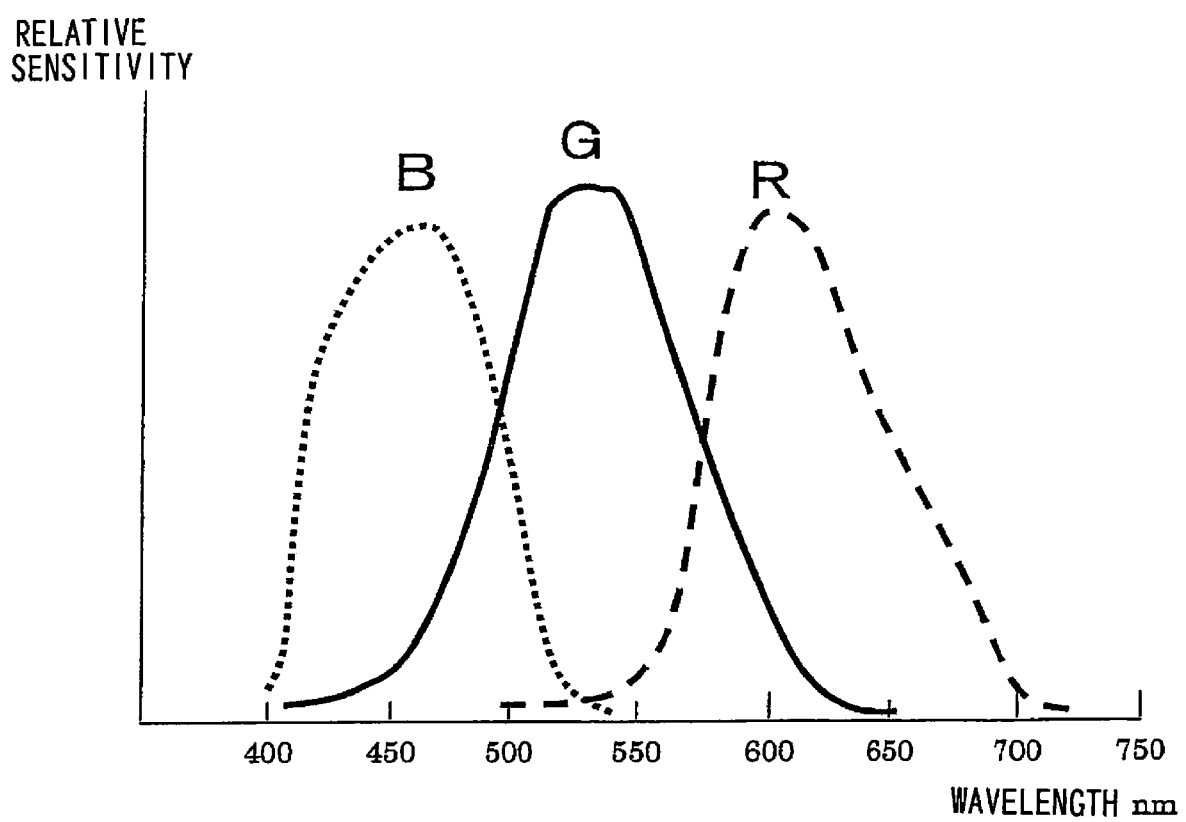
FIG. 6 shows spectral characteristics substantially representing the sum of the spectral characteristics of the green imaging pixels, the red imaging pixels and the blue imaging pixels.

FIG. 4 is a front view showing the imaging pixels 310. The imaging pixels 310 each include a micro-lens 10 a photoelectric conversion unit 11 and a color filter (not shown) The color filters at the individual imaging pixels each assume one of the three colors, red (R), green (G) or blue (B) and the red, green and blue color filters assume spectral sensitivity characteristics shown in FIG. 6. As shown in FIG. 3, the imaging pixels 310 equipped with such color filters are arranged in a Bayer array at the image sensor 212.

Figure 5:
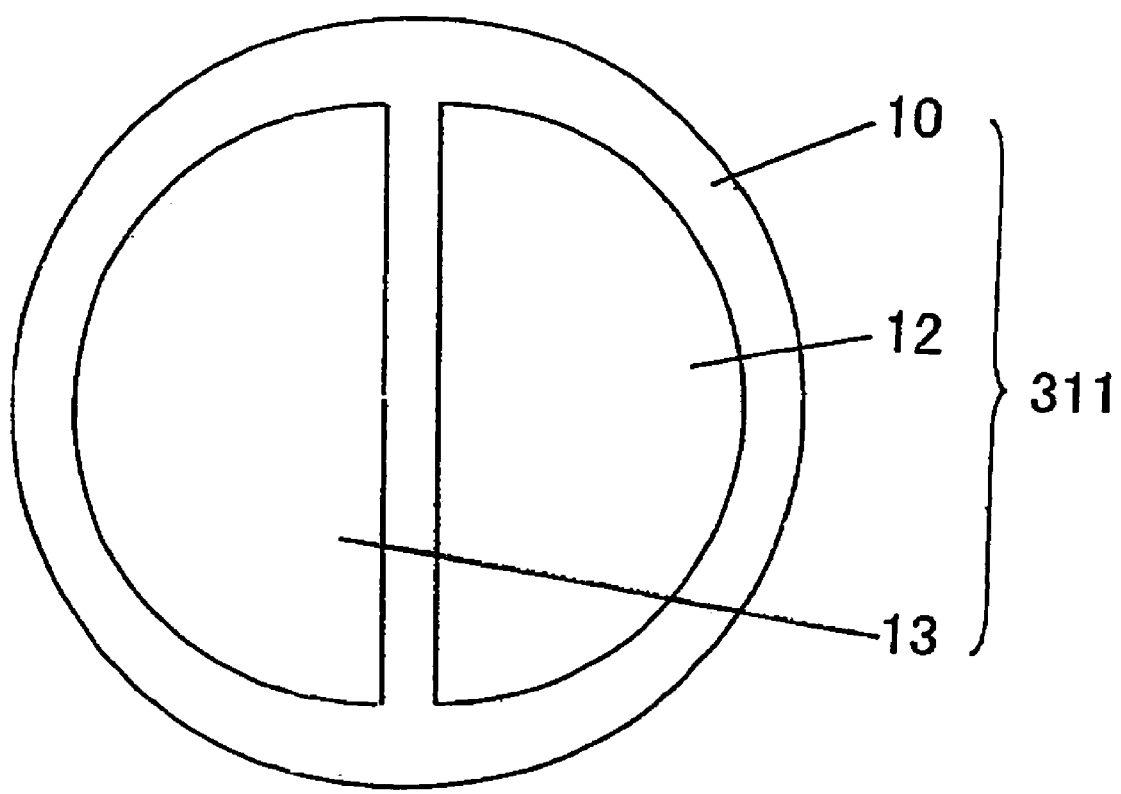
FIG. 5 is a front view of a focus detection pixel.
Figure 7:
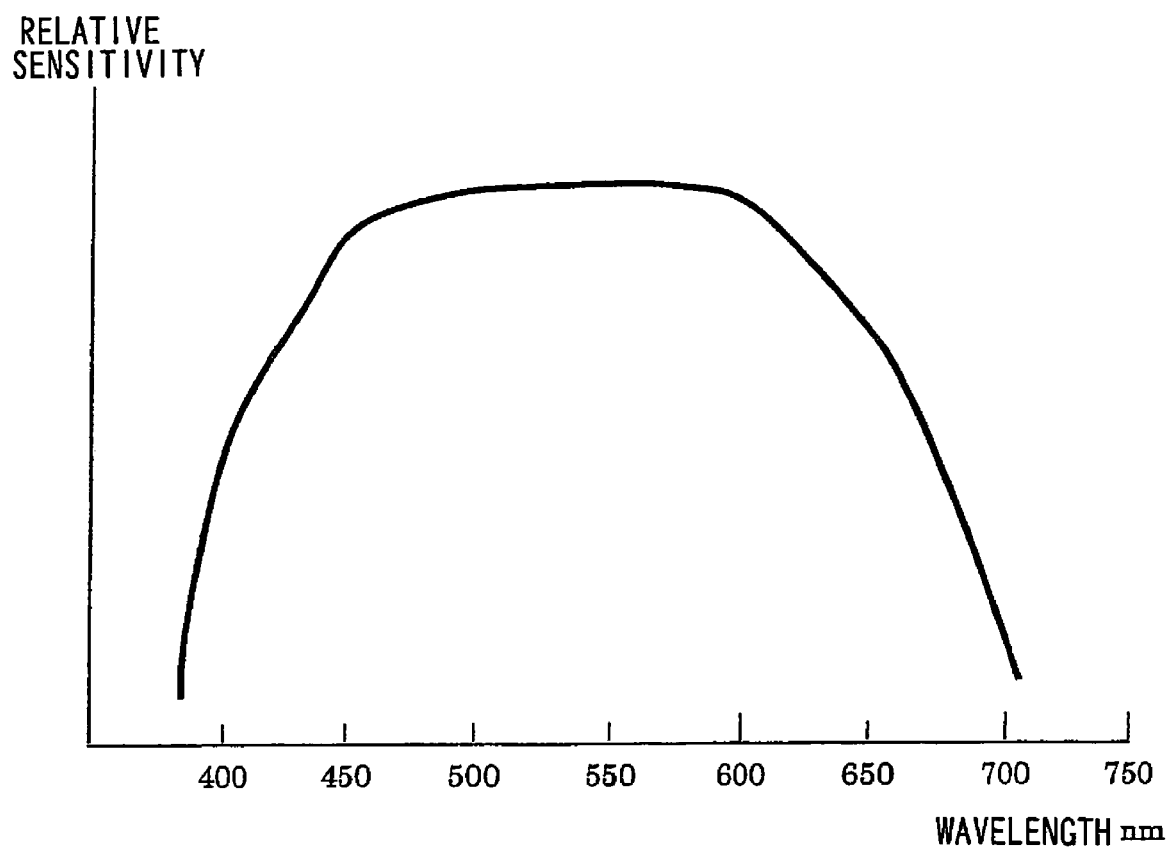
FIG. 7 shows spectral characteristics achieved by integrating the spectral sensitivity of the photodiodes at which photoelectric conversion is executed and the spectral characteristics of the infrared cut filter (not shown)

FIG. 5 is a front view showing the focus detection pixels 31. The focus detection pixels 311 each include a micro-lens 10 and a pair of photoelectric conversion units 12 and 13. In order to assure a sufficient light quantity, no color filters are disposed at the focus detection pixels 311. The focus detection pixels have the spectral sensitivity characteristics (see FIG. 7), which are achieved by integrating the spectral sensitivity of the photodiodes engaged in photoelectric conversion and the spectral sensitivity characteristics of the infrared cut filters (not shown). Namely, the spectral sensitivity characteristics are similar to the sum of the spectral sensitivity characteristics of the green pixels (G), the red pixels (R) and the blue pixels (B) shown in FIG. 6, which indicate sensitivity in a light wavelength range containing the light wavelength ranges corresponding to the sensitivity characteristics of all the pixels, i.e., the green pixels, the red pixels and the blue pixels.

The photoelectric conversion unit 11 at the imaging pixel 310 is designed such that the photoelectric conversion unit allows to receive all the light flux passing through the exit pupil of a faster interchangeable lens (e.g., equivalent to F 1.0) via the micro-lens 10. In addition, the pair of photoelectric conversion units 12 and 13 at each focus detection pixel 311 are designed so as to receive all the light fluxes passing through the specific exit pupil of the interchangeable lens (e.g., F 2.8) via the micro-lens 10.

As shown in FIG. 3, R, G and B color filters forming an RGB Bayer array are disposed each at one of the imaging pixels 310 arrayed in the two-dimensional pattern. The focus detection pixels 311 are densely arrayed next to one another along a straight line in a row that would otherwise be taken up by blue imaging pixels B and green imaging pixels G among the imaging pixels 310. The following advantage is achieved by disposing the focus detection pixels 311 along the horizontal rows that would otherwise be taken up by blue imaging pixels 310 and green imaging pixels 310. Namely, a slight error, occurring when generating pixel signals at points taken up by the focus detection pixels 311 through pixel interpolation to be detailed later, can remain more or less unnoticeable to the human eye, since the human eye is more perceptive to red than to blue and the green pixels, disposed with higher density compared to the blue pixels and the red pixels, have a lower defect contribution factor per pixel. The focus detection pixels 311 are arrayed within a focus detection area.

Figure 8:
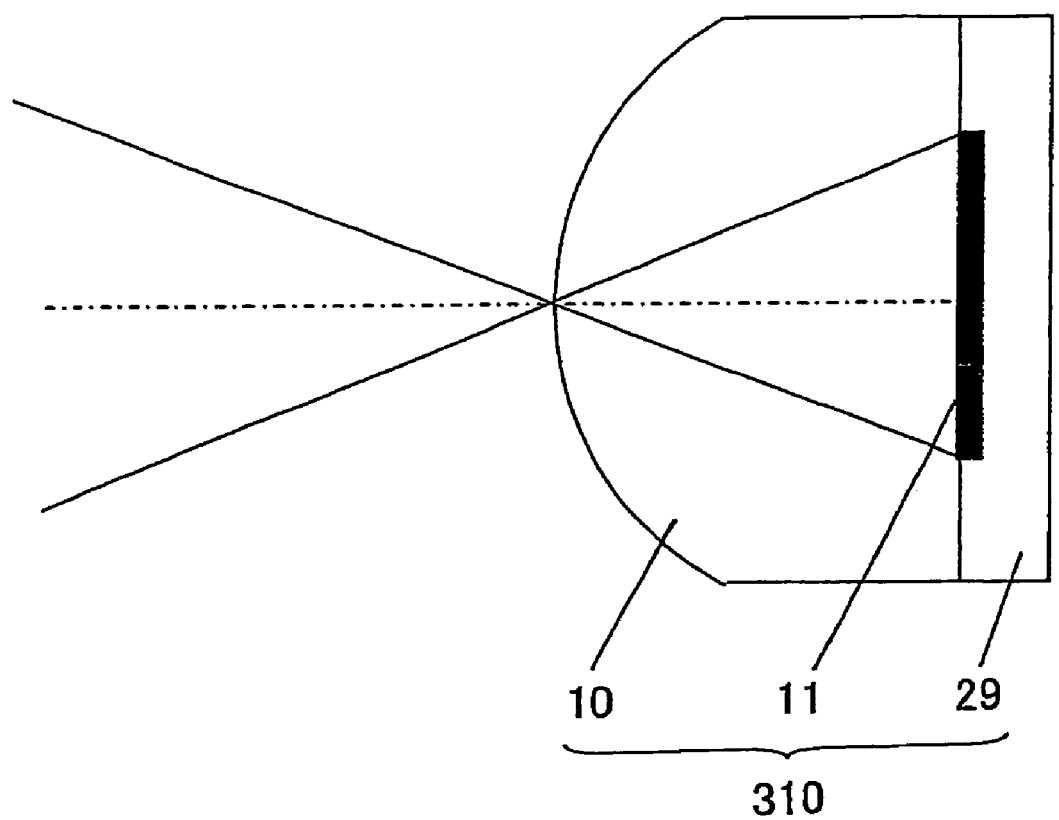
FIG. 8 is a sectional view of an imaging pixel.

FIG. 8 is a sectional view of an imaging pixel 310. The micro-lens 10 is set to the front of the imaging photoelectric conversion unit 11 at the imaging pixel 310 and, as a result, an image of the photoelectric conversion unit 11 is projected frontward via the micro-lens 10. The photoelectric conversion unit 11 is formed on a semiconductor circuit substrate 29. In addition, the color filter (not shown) is disposed between the micro-lens 10 and the photoelectric conversion unit 11.

Figure 9:
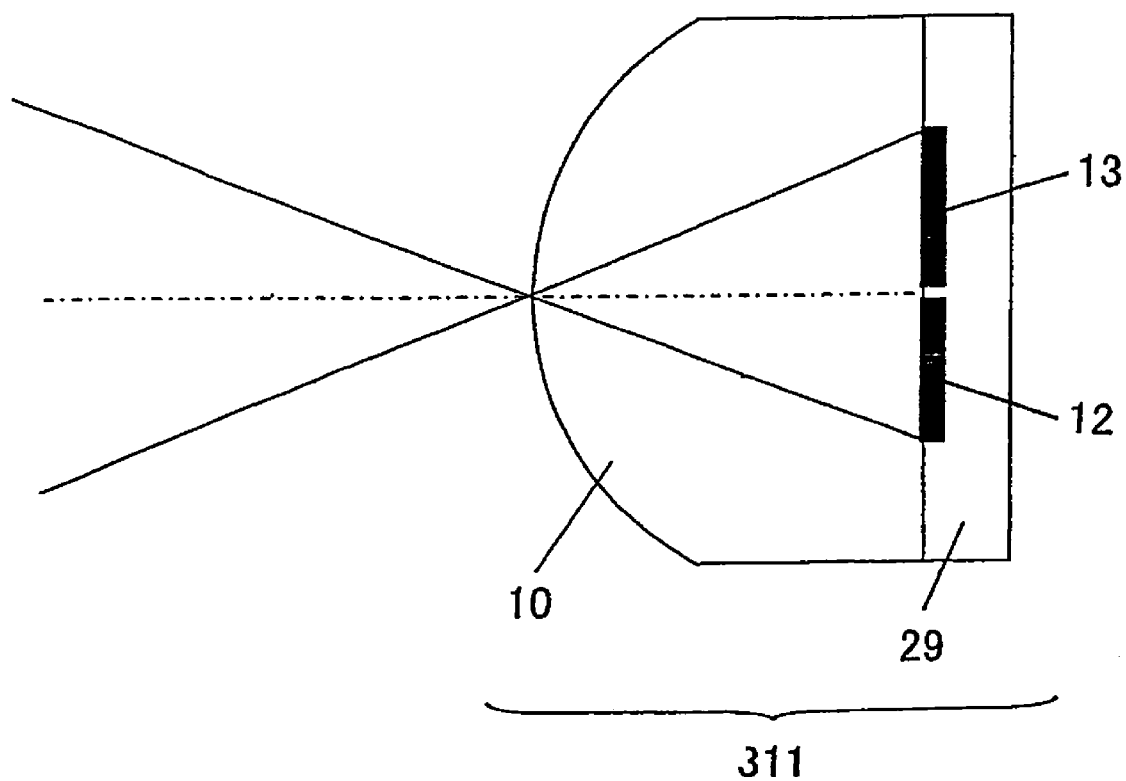
FIG. 9 is a sectional view of a focus detection pixel.

FIG. 9 presents a sectional view of a focus detection pixel 311. The micro-lens 10 is disposed to the front of the focus detection photoelectric conversion units 12 and 13 at the focus detection pixel 311 so as to project the photoelectric conversion units 12 and 13 along the frontward direction via the micro-lens 10. The photoelectric conversion units 12 and 13 are formed on the semiconductor circuit substrate 29.

Figure 10:
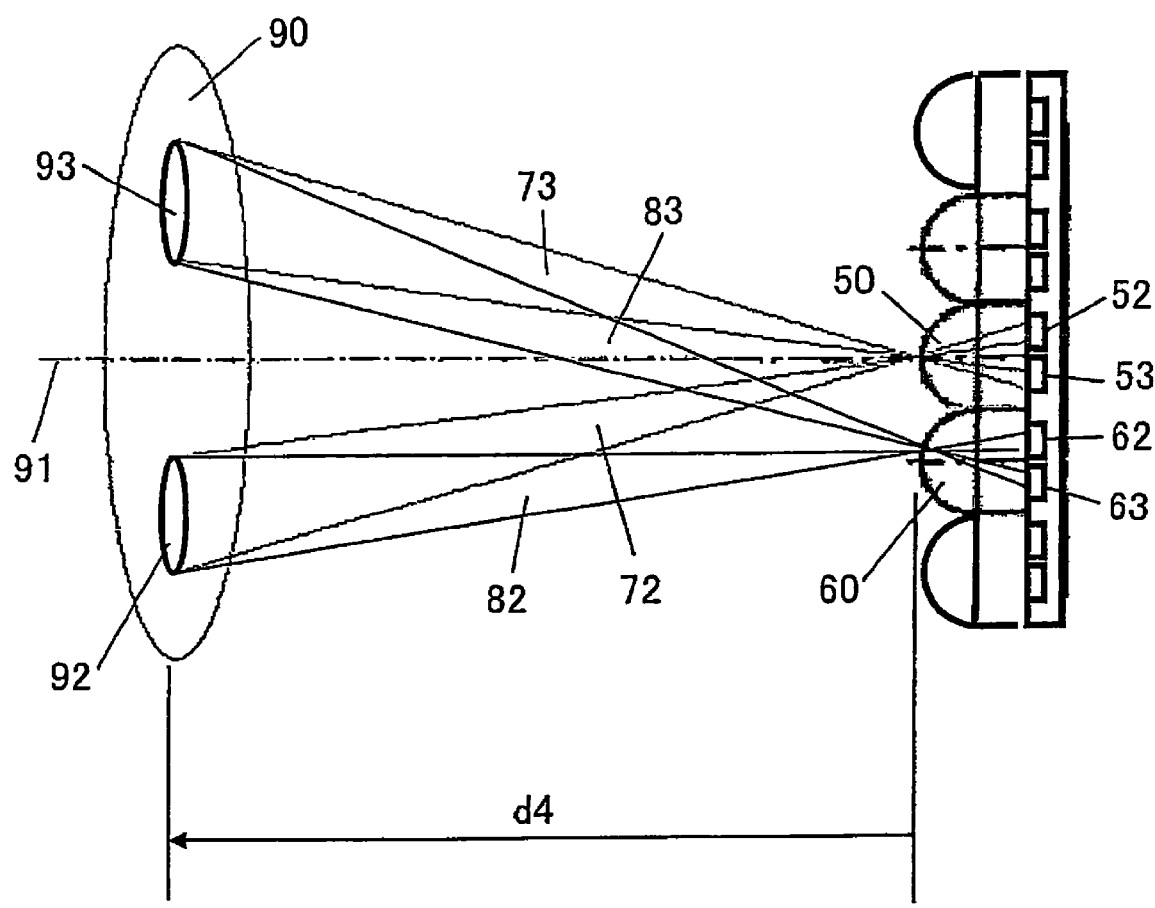
FIG. 10 shows the structure of a focus detection optical system used to detect the focus state through a split-pupil phase difference detection by using micro-lenses.

Focus detection adopting a split pupil method, executed by using micro-lenses, is now described in reference to FIG. 10. Reference numeral 90 indicates the exit pupil set over a distance d4 along the frontward direction from the micro-lenses disposed near the predetermined imaging plane of the interchangeable lens 202. The distance d4 is determined in correspondence to the curvature of the micro-lenses, the refractive index of the micro-lenses, the distance between the micro-lenses and the photoelectric conversion units and the like, and is referred to as a distance of pupil for focus detection in this description. Reference numeral 91 indicates the optical axis of the interchangeable lens, reference numerals 50 and 60 each indicate a micro-lens, reference numerals (52, 53) and (62, 63) indicate pairs of photoelectric conversion units at focus detection pixels and reference numerals (72, 73) and (82, 83) indicate focus detection light fluxes. Reference numeral 92 indicates an area defined by the photoelectric conversion units 52 and 62 projected via the micro-lenses 50 and 60, and this area is hereafter referred to as a pupil for focus detection in the description. Reference numeral 93 indicates an area defined by the photoelectric conversion units 53 and 63 projected via the micro-lenses 50 and 60 and this area is hereafter referred to as a pupil for focus detection.

While FIG. 10 schematically shows the focus detection pixel (constituted with the micro-lens 50 and the pair of photoelectric conversion units 52 and 53) disposed on the optical axis 91 and an adjacent focus detection pixel (constituted with the micro-lens 60 and the pair of photoelectric conversion units 62 and 63), the pairs of photoelectric conversion units of other focus detection pixels, too, receive light fluxes arriving at their micro-lenses from the pair of pupils for focus detection.

The focus detection pixels are arrayed in a direction matching the direction in which the pair of pupils for focus detection are set side-by-side. The micro-lenses 50 and 60 are disposed near the predetermined image forming plane of the imaging optical system (equivalent to the interchangeable lens 202 shown in FIG. 1). The shapes of the pair of photoelectric conversion units 52 and 53 disposed behind the micro-lens 50 set on the optical axis 91 are projected via the micro-lens 50 onto the exit pupil 90 set apart from the micro-lenses 50 and 60 by the distance d4 of the pupil for focus detection, and the projected shapes define the pupils 92 and 93 for focus detection.

The shapes of the pair of photoelectric conversion units 62 and 63 disposed behind the micro-lens 60 adjacent to the micro-lens 50 are projected via the micro-lens 60 onto the exit pupil 90 set apart by the distance d4 of the pupil for focus detection, and the projected shapes define the pupils 92 and 93 for focus detection. Namely, the positional relationship between the micro-lens and the photoelectric conversion units in each pixel is determined so that the projected shapes (pupils 92 and 93 for focus detection) of the photoelectric conversion units at the various focus detection pixels are aligned on the exit pupil 90 located over the distance d4 of the pupil for focus detection.

The photoelectric conversion unit 52 outputs a signal corresponding to the intensity of an image formed on the micro-lens 50 with the light flux 72 having passed through the pupil 92 for focus detection and having advanced toward the micro-lens 50. The photo electric conversion unit 53 outputs a signal corresponding to the intensity of an image formed on the micro-lens 50 with the focus detection light flux 73 having passed through the pupil 93 for focus detection and having advanced toward the micro-lens 50.

The photoelectric conversion unit 62 outputs a signal corresponding to the intensity of an image formed on the micro-lens 60 with the light flux 82 having passed through the pupil 92 for focus detection and having advanced toward the micro-lens 60. The photoelectric conversion unit 63 outputs a signal corresponding to the intensity of an image formed on the micro-lens 60 with the focus detection light flux 83 having passed through the pupil 93 for focus detection and having advanced toward the micro-lens 60.

By linearly disposing a large number of focus detection pixels each structured as described above and integrating the outputs from the photoelectric conversion units at the individual focus detection pixels into output groups each corresponding to one of the two pupils 92 and 93 for focus detection, information related to the intensity distribution of the pair of images formed on the focus detection pixel row with the individual focus detection light fluxes passing through the pupil 92 for focus detection and the pupil 93 for focus detection, is obtained. Image shift detection arithmetic processing (correlation arithmetic processing, phase difference detection processing), to be detailed later, is subsequently executed by using the information thus obtained so as to detect the extent of image shift manifested by the pair of images through the split-pupil phase difference detection method. Then, by executing a conversion operation on the image shift quantity in correspondence to the distance between the gravitational centers (center position of gravity) of the pair of pupils for focus detection, the deviation (defocus amount) of the current image forming plane (the image forming plane at the focus detection point corresponding to the point assumed by the micro-lens array on the predetermined imaging plane) relative to the predetermined imaging plane is calculated.

The focus detection light is distributed at the pupils 92 and 93 for focus detection (distribution of pupil for focus detection) with patterns of blurring superimposed on the shapes of the projected photoelectric conversion units due to the aberration and diffraction introduced by the micro-lenses. If the light beams passing through the pupils for focus detection are restricted via a component (e.g., the aperture or a lens opening) of the interchangeable lens 202 (see FIG. 1), an imbalance occurs in the waveforms of the pair of images formed by the pair of restricted focus detection light fluxes. In other words, the pair of waveforms are offset relative to each other along the lateral direction to begin with. While this point is to be explained in detail later, the image shift detection calculation must assure accurate image shift detection even with such unbalanced image waveforms.

Figure 11:
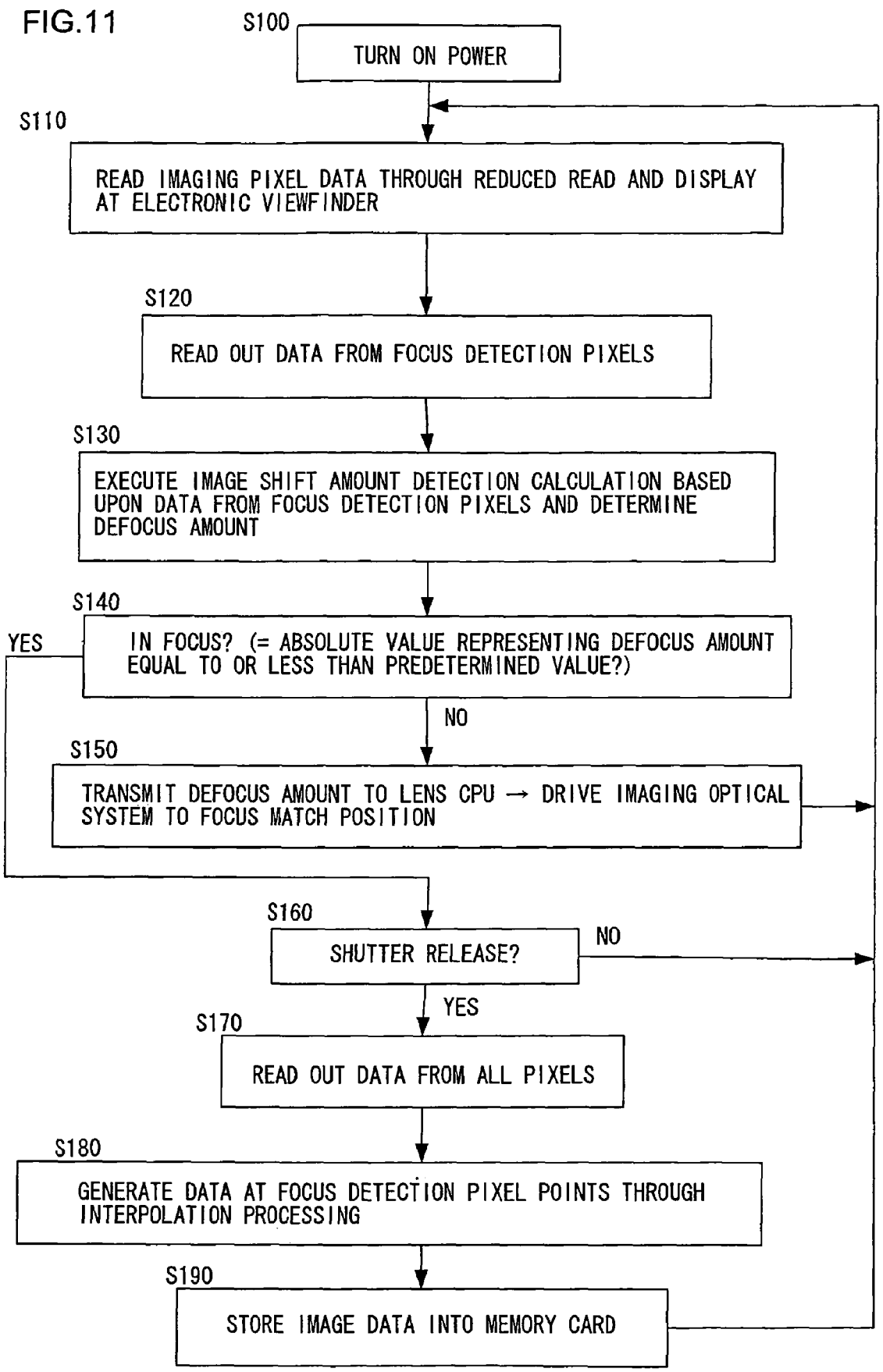
FIG. 11 presents a flowchart of the imaging operation executed in the digital still camera (imaging apparatus) shown in FIG. 1.

FIG. 11 presents a flowchart of the imaging operation executed in the digital still camera (imaging apparatus) shown in FIG. 1. As the power to the camera 201 is turned on in step 100, the body drive control device 214 starts the imaging operation to be executed in step 110 and subsequent steps. In step 110, a reduced read of the data from the imaging pixels is executed and an image corresponding to the data thus read are displayed at the electronic viewfinder. In the following step 120, data are read out from the focus detection pixel row. It is to be noted that the photographer will have selected a specific focus detection area via an area selection operation member (not shown).

In step 130, the image shift detection arithmetic processing (correlation calculation processing) to be detailed later is executed based upon the pair of sets of image data corresponding to the particular focus detection pixel row to calculate an image shift amount. The image shift amount is then converted to the defocus amount indicating the extent of defocusing through the conversion processing to be detailed later. In step 140, a decision is made as to whether or not the current condition is close in focus, i.e., whether or not the absolute value of the defocus amount is equal to or less than a predetermined value. If it is decided that the current condition is not close in focus, the operation proceeds to step 150 to transmit the calculated defocus amount to the lens drive control device 206 which then drives the focusing lens 210 at the interchangeable lens 202 to the focus position. Subsequently, the operation returns to step 110 to repeatedly execute the operation described above. It is to be noted that the operation also branches to this step if focus detection is not possible to transmit a scan drive instruction to the lens drive control device 206. In response, the lens drive control device drives the focusing lens 210 at the interchangeable lens 202 to scan between the infinity position and the close-up position. Subsequently, the operation returns to step 110 to repeatedly execute the operation described above.

If, on the other hand, it is decided that the current condition is close in focus, the operation proceeds to step 160 to make a decision as to whether or not a shutter release has occurred in response to an operation of the shutter release button (not shown). If it is decided that a shutter release has not yet occurred, the operation returns to step 110 to repeatedly execute the operation described above. If it is decided that a shutter release has occurred, the operation proceeds to step 170 to transmit an aperture adjustment instruction to the lens drive control device 206 and thus set the aperture at the interchangeable lens 202 to a control F number (an F number selected by the photographer or an F number automatically set in the camera).

As the aperture control ends, the image sensor is engaged in an imaging operation and image data originating from the imaging pixels and all the focus detection pixels at the image sensor 212 are read out. In step 180, image data at points assumed by the individual pixels in the focus detection pixel rows are interpolated based upon the data at the focus detection pixels and surrounding imaging pixels. In the following step 190, image data constituted with the data at the imaging pixels and the interpolated data are recorded into the memory card 219. Then the operation returns to step 110 to repeatedly execute the operation described above.

Next, the image shift detection arithmetic processing (correlation calculation processing) executed in step 130 in FIG. 11 is explained in detail. Since an imbalance may have occurred with regard to the quantities of light in the pair of images detected via the focus detection pixels, a specific type of correlation calculation which assures a satisfactory level of image shift detection accuracy even in the event of an imbalance in the light quantities needs to be executed.

High-frequency cut filter processing such as that expressed in (2) below is executed on a pair of data strings ($\alpha_1 \sim \alpha_m$ and $\beta_1 \sim \beta_m$: m indicates the number of sets of data) output from the focus detection pixel row, so as to generate a first data string ($A_1 \sim A_N$) and a second data string ($B_1 \sim B_N$), from which a noise component or a high-frequency component that would adversely affect the correlation processing has been eliminated. It is to be noted that the high-frequency cut filter processing may be skipped if the arithmetic operation needs to be completed faster or if the extent of defocusing is already significant and thus it is obvious that only a very small high-frequency component is present.

$$A_n = \alpha_n + 2 \times \alpha_{n+1} + \alpha_{n+2}$$

$$B_n = \beta_n + 2 \times \beta_{n+1} + \beta_{n+2} \quad (1)$$

In expression (1) above, n=1~N.

The body drive control device 214 calculates the correlation quantity C(k) by executing a correlation operation expressed in (3) on the data strings $A_n$ and $B_n$ $$C(k) = \Sigma |A_n \times B_{n+1+k} - B_{n+k} \times A_{n+1}| \quad (2)$$

In expression (2), the $\Sigma$ operation is cumulatively executed with regard to n and the range assumed form is limited to the range over which the data $A_n$, $A_{n+1}$, $B_{n+k}$ and $B_{n+1+k}$ exist in correspondence to the shift quantity k. In addition, the shift quantity k is an integer which represents a relative shift quantity assuming a value taken in units matching the data interval with which the data in the data strings are sampled.

Figure 12A:
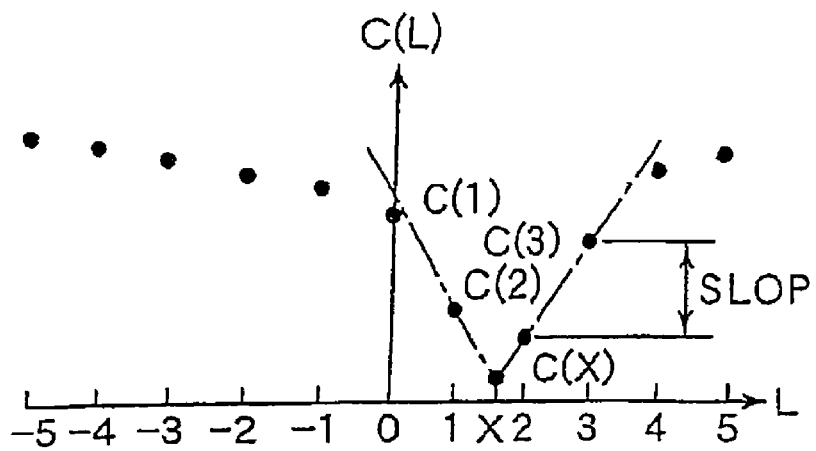
FIGS. 12A through 12C illustrate in detail the image shift detection arithmetic processing (correlation calculation processing)

The results of the arithmetic operation executed as expressed in (2) may indicate that the correlation quantity C(k) assumes the smallest value (the smaller the value, the higher the correlation level) at the shift quantity at which the pair of sets of data achieve a high level of correlation (when k=kj=2 in FIG. 12A). The shift quantity x, which gives the smallest value C(x) in the continuous correlation quantity graph, is determined by adopting a three-point interpolation method expressed in (3)~(6) below.

$$x = k_j + D/SLOP \quad (3)$$

$$C(x) = C(k_j) - |D| \quad (4)$$

$$D = \{C(k_{j-1}) - C(k_{j+1})\}/2 \quad (5)$$

$$SLOP = MAX\{C(k_{j+1}) - C(k_j), C(k_{j-1}) - C(k_j)\} \quad (6)$$

Figure 12B:
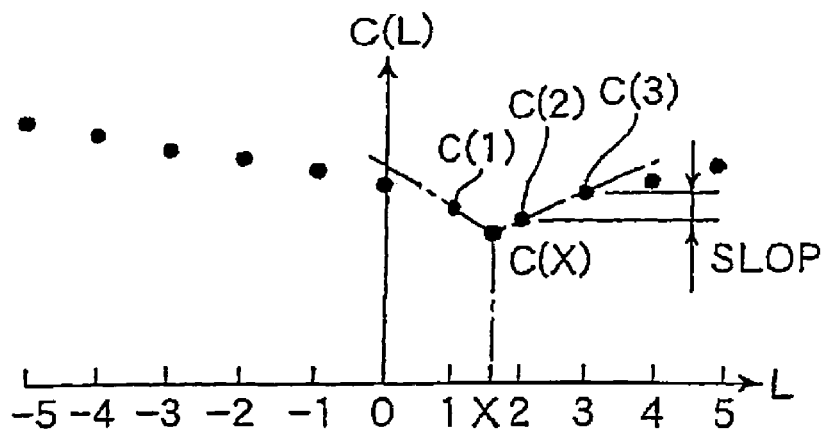

The judgment as to whether or not the shift quantity x calculated as expressed in (3) is reliable is made as follows. As shown in FIG. 12B, the interpolated minimum value C(x) of the correlation quantity increases when the level of correlation between the pair of sets of data is low. Accordingly, if C(x) is equal to or greater than a predetermined threshold value, the body drive control device 214 judges the shift quantity to be less reliable and the calculated shift quantity x is canceled. Alternatively, C(x) may be standardized with regard to the data contrast, and in such a case, if the value obtained by dividing C(x) by SLOP indicating a value in proportion to the contrast is equal to or greater than a predetermined value, the calculated shift quantity should be judged to be not reliable and accordingly, the calculated shift quantity x is canceled. As a further alternative, if SLOP indicating the value in proportion to the contrast is equal to or less than a predetermined value, the body drive control device 214 judges that the subject is a low-contrast subject and, accordingly, the reliability of the calculated shift quantity should be judged to be low. In such as case, the calculated shift quantity x is canceled.

Figure 12C:
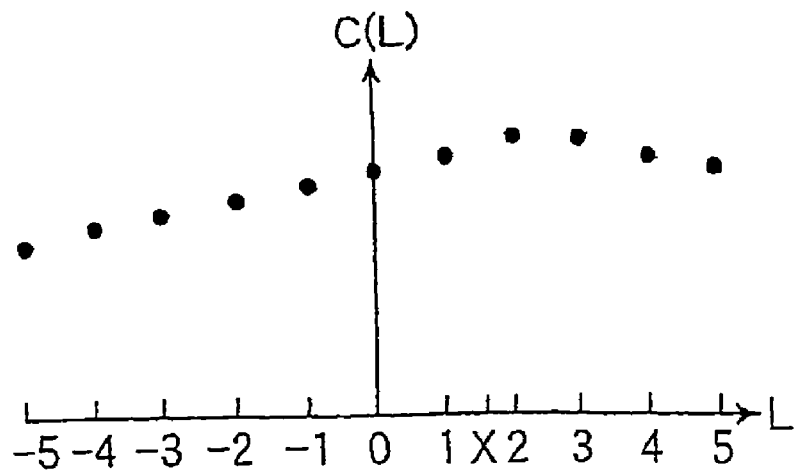

If the level of correlation between the pair of sets of data is low and the correlation quantity C(k) does not dip at all over the shift range kmin to kmax, as shown in FIG. 12C, the minimum value C(x) cannot be determined by the body drive control device 214. In this case, it is decided that focus detection cannot be executed.

The correlation quantity may be calculated by using a correlation operation expression other than expression (2). As long as the level of correlation between a pair of sets of image data with a gain difference relative to each other can be detected. For instance, a correlation operation may be executed to calculate the level of correlation between the first signal data string and the second signal data string by first generating first arithmetic operation data constituted with the product of multiplying first data in the first data string by data near second data corresponding to the first data, which are part of the second signal data string. Then, second arithmetic operation data may be generated by multiplying the second data in the second signal data string by data near the first data in the first signal data string, and the correlation factor indicating the level of correlation between the first arithmetic operation data and the second arithmetic operation data may be calculated.

As an alternative, a correlation operation may be executed to calculate a correlation factor indicating the level of correlation between the first signal data string and the second signal data string by first obtaining arithmetic operation data by executing a first arithmetic operation on first data and data near the first data in the first signal data string. Then, arithmetic operation data may be obtained through a second arithmetic operation executed on second data corresponding to the first data and data near the second data in the second signal data string. First arithmetic operation data may be obtained as the product of the two sets of arithmetic operation data. Next, arithmetic operation data may be obtained through the first arithmetic operation executed on the second data and the data near the second data in the second signal data string and arithmetic operation data may be obtained through the second arithmetic operation executed on the first data and the data near the first data in the first signal data string. Second arithmetic operation data may be obtained as the product of the two sets of arithmetic operation data. Subsequently, the correlation factor indicating the level of correlation between the first arithmetic operation data and the second arithmetic operation data may be calculated.

As a further alternative, the following correlation operation may be executed to determine a correlation factor indicating the level of correlation between the first signal data string and the second signal data string. First, first arithmetic operation data and second arithmetic operation data may be generated by executing a first arithmetic operation and a second arithmetic operation on at least either first data or data near the first data in the first signal data string and then third arithmetic operation data may be generated by dividing the first arithmetic operation data by the second arithmetic operation data. Next, fourth arithmetic operation data and fifth arithmetic operation data may be generated by executing the first arithmetic operation and the second arithmetic operation on at least either second data corresponding to the first data or data near the second data in the second signal data string and then sixth arithmetic operation data may be generated by dividing the fourth arithmetic operation data by the fifth arithmetic operation data. Then, the correlation factor indicating the level of correlation between the third arithmetic operation data and the sixth arithmetic operation data may be calculated.

As yet another alternative, the following correlation operation may be executed to determine a correlation factor indicating the level of correlation between the first signal data string and the second signal data string. First, first arithmetic operation data may be generated by executing a first arithmetic operation on at least either first data or data near the first data in the first signal data string. Then, second arithmetic operation data may be generated by executing the first arithmetic operation on at least either second data corresponding to the first data or data near the second data in the second signal data string, and third arithmetic operation data may be generated by dividing the first arithmetic operation data by the second arithmetic operation data. Subsequently, fourth arithmetic operation data may be generated by executing a second arithmetic operation on at least either first data or data near the first data in the first signal data string. Then, fifth arithmetic operation data may be generated by executing the second arithmetic operation on at least either second data or data near the second data in the second signal data string, and sixth arithmetic operation data may be generated by dividing the fourth arithmetic operation data by the fifth arithmetic operation data. Subsequently, the correlation factor indicating the level of correlation between the third arithmetic operation data and the sixth arithmetic operation data may be calculated.

If the shift quantity x having been calculated is judged to be reliable, the shift quantity is then converted to an image shift amount shft as expressed in (7) below.

$$shft = PY \times X \qquad (7)$$

In expression (7), PY represents the detection pitch (the pitch at which the focus detection pixels are arrayed).

The conversion processing executed in step 130 in FIG. 11 to convert the image shift amount to the defocus amount is now described in detail. In reference to FIGS. 13A-1 through 13C, vignetting of the focus detection light fluxes is explained. In FIG. 13C, a point 97 indicates a focus detection point set on the optical axis 91 at the predetermined imaging plane 95, whereas a point 98 in FIG. 13C indicates a focus detection point set apart from the point 97 by a distance Px. In addition, a plane 90 is a pupil plane for focus detection set apart from the predetermined imaging plane 95 by the distance d4 of the pupil for focus detection, a plane 94 is a plane set apart from the predetermined imaging plane 95 by a distance d2 (>d4) and a plane 99 is a plane set apart from the predetermined imaging plane 95 by a distance d3 (<d4) A straight line 96 extends from the focus detection point 98 toward the center of the pupil plane 90 for focus detection, a point Ba is an intersection at which the plane 90, 94 and 99 intersect with the optical axis 91 and a point Bb is an intersection at which the planes 90, 94 and 99 intersect with the straight line 96.

FIGS. 13A-1, 13A-2 and 13A-3 are front views respectively illustrating the relationship between a lens exit pupil opening L1 which restricts the focus detection light fluxes, set over a distance matching the distance to the plane 94, and the distributions (pupil distributions) C1 and C2 of the pair of focus detection light fluxes traveling to the focus detection point 97, the relationship between a lens exit pupil opening L2 which restricts the focus detection light fluxes, set over a distance matching the distance to the plane 90, and the distributions (pupil distributions) C1 and C2 of the pair of focus detection light fluxes traveling to the focus detection point 97, and the relationship between a lens exit pupil opening L3 which restricts the focus detection light fluxes, set over a distance matching the distance to the plane 99, and the distributions (pupil distributions) C1 and C2 of the pair of focus detection light fluxes traveling to the focus detection point 97. FIGS. 13A-1, 13A-2 and 13A-3 also present sectional views, each indicating the distributions of the quantities of the focus detection light fluxes, manifesting along the direction in which the pair of pupil distributions C1 and C2 are set side-by-side. Ga1 and Ga2 indicate the gravitational centers (center positions of gravity) of the pupil distributions C1 and C2 of the pair of focus detection light fluxes having been restricted by the lens exit pupil opening L1, L2 or L3.

FIGS. 13B-1, 13B-2 and 13B-3 are front views respectively illustrating the relationship between a lens exit pupil opening L1 present at the plane 94 and the distributions (pupil distributions) H1 and H2 of the pair of focus detection light fluxes traveling to the focus detection point 98, the relationship between a lens exit pupil opening L2 present at the plane 90, and the distributions (pupil distributions) H1 and H2 of the pair of focus detection light fluxes traveling to the focus detection point 97 and the relationship between a lens exit pupil opening L3 which restricts the focus detection light fluxes, set over a distance matching the distance to the plane 99, and the distributions (pupil distributions) H1 and H2 of the pair of focus detection light fluxes traveling to the focus detection point 98. FIGS. 13B-1, 13B-2 and 13B-3 also presents sectional views, each indicating the distributions of the quantities of the focus detection light fluxes manifesting along the direction in which the pair of pupil distributions H1 and H2 are set side-by-side. Gb1 and Gb2 indicate the gravitational centers (center positions of gravity) of the pupil distributions H1 and H2 of the pair of focus detection light fluxes having been restricted by the lens exit pupil opening L1, L2 or L3.

When the selected focus detection point is at the center (point 97) of the predetermined imaging plane, the lens exit pupil opening L1, L2 or L3 restricts the pupil distributions C1 and C2 of the pair of focus detection light fluxes symmetrically with respect to the optical axis 91. As a result, the gravitational centers Ga1 and Ga2 of the pupil distributions C1 and C2 of the pair of focus detection light fluxes assume points which are symmetrical relative to the point Ba on the optical axis 91.

If, on the other hand, the selected focus detection point is in the periphery of the predetermined imaging plane (point 98), the pupil distributions H1 and H2 of the pair of focus detection light fluxes do not assume a symmetrical relationship relative to the optical axis 91, except for at the pupil plane 90 for focus detection. For this reason, the pupil distributions H1 and H2 of the pair of focus detection light fluxes are restricted asymmetrically via the lens exit pupil opening L1 or the lens exit pupil opening L3 although the pupil distributions H1 and H2 of the pair of focus detection light fluxes are restricted symmetrically with respect to the optical axis 91 via the lens exit pupil opening L2 set at the pupil plane 90 for focus detection. As a result, while the gravitational centers Gb1 and Gb2 of the pupil distributions H1 and H2 of the pair of focus detection light fluxes assume points symmetrical to each other on the pupil plane 90 for focus detection relative to the point Bb set on the optical axis 91, they assume asymmetrical points relative to the point Bb on the planes 94 and 99.

The value indicating a center position of gravity can be calculated by determining the gravitational center of a pupil distribution within the exit pupil opening based upon pupil distribution information and exit pupil opening information. The pupil distribution information can be obtained through substantial approximation by proportionally enlarging or reducing the value indicated in basic pupil distribution information constituted with pupil distribution information for the pupil plane 90 for focus detection by a factor corresponding to the distances d2 and d3 to the planes 94 and 99. In addition, by shifting the pupil distribution information obtained in correspondence to each plane along the straight line 96 based upon the information (positional information) indicating a position of the focus detection point, pupil distribution information corresponding to the position of focus detection point can be obtained through approximation.

This means that the value indicating a gravitational center point of a focus detection light flux restricted by an exit pupil opening set over a given distance can be determined through arithmetic operation executed by using input data indicating the position of focus detection point, the exit pupil opening size, the exit pupil opening distance, the basic pupil distribution information and the distance of the pupil for focus detection. However, such an arithmetic operation is bound to be complex and thus require a significant length of execution time. Accordingly, the distance of the pupil for focus detection may be set as a fixed value based upon basic pupil information obtained in advance through measurement or calculation and the position value of the gravitational center point may be provided in a table prepared in advance through arithmetic operation executed by using the focus detection point, the exit pupil opening diameter (dimensional information) and the exit pupil distance (distance information) as parameters.

Figure 14:
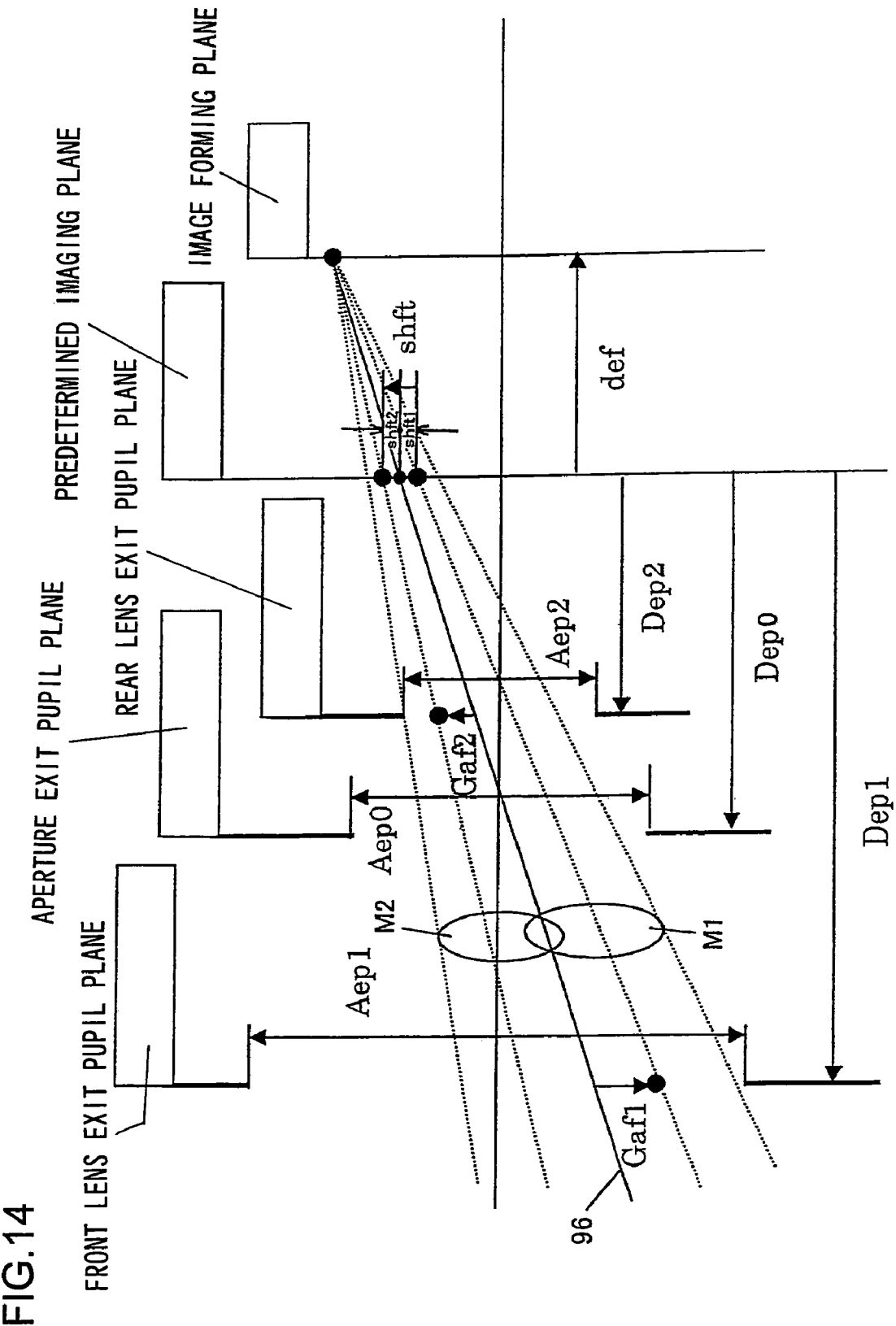
FIG. 14 illustrate the concept of conversion of the image shift amount to the defocus amount.

FIG. 14 illustrates the concept of conversion of the image shift amount to the defocus amount. While FIGS. 13A-1 through 13C illustrate how the focus detection light fluxes may become vignetted by a single exit pupil opening (any of L1, L2 and L3), the focus detection light fluxes are actually vignetted by a plurality of openings. In FIG. 14, Dep1 indicates the distance to a front lens exit pupil plane from the predetermined imaging plane, Aep1 indicates the diameter of the front lens exit pupil, Dep2 indicates the distance to career lens exit pupil plane from the predetermined imaging plane, Aep2 indicates the diameter of the rear lens exit pupil and def indicates the distance from the predetermined imaging plane to the image forming plane (defocus amount). In addition, Dep0 indicates the distance to the aperture exit pupil plane from the predetermined imaging plane and Aep0 indicates the diameter of the aperture exit pupil.

FIG. 14 shows an opening formed via the aperture (aperture exit pupil), an opening (front lens exit pupil) formed via the front lens (the lens with an opening diameter that restricts the light fluxes traveling to the periphery of the image plane to the greatest extent among the lenses present further frontward relative to the aperture) and an opening (rear lens exit pupil) formed via the rear lens (the lens with an opening diameter that restricts the light fluxes traveling to the periphery of the image plane to the greatest extent among the lenses present rearward of the aperture). FIG. 14 shows one of the pair of focus detection light fluxes corresponding to the focus detection point, i.e., a focus detection light flux M1, vignetted to the greatest extent via the front lens and the other focus detection light flux M2 vignetted to the greatest extent by the rear lens.

In FIG. 14, Gaf1 indicates the distance between the center position of gravity of the focus detection light flux M1 having been vignetted via the front lens, assumed on the front lens exit pupil plane, and the distribution center of the pair of focus detection light fluxes (the intersection at which the straight line 96 and the front lens exit pupil plane having been described earlier in reference to FIGS. 13A-1 through 13C intersect each other). In addition, Gaf2 indicates the distance between the center position of gravity of the focus detection light flux M2 having been vignetted via the rear lens, taken on the rear lens exit pupil plane, and the distribution center of the pair of focus detection light fluxes. It is to be noted that the terms "front lens exit pupil" and "rear lens exit pupil" are used to refer to the virtual images of the front lens opening and the rear lens opening, viewed from the predetermined imaging plane side.

When the pair of focus detection light fluxes are vignetted by different exit pupil openings as described above, the detected image shift amount shft represents the sum of an image shift amount shft1 indicating the extent of image shift attributable to the focus detection light flux M1 and an image shift amount shft2 indicating the extent of image amount attributable to the focus detection light flux M2.

The image shift amount shft1 is determined based upon the similarity (proportional relation) between the triangle assuming a base side length Gaf1 and a height (Dep1+def) and the triangle assuming a base side length shft1 and a height def as backed by the geometric logic illustrated in FIG. 14. Namely, the relationship between the image shift amount shft1 and the defocus amount def can be determined based on the proportional relation between the relationship of the defocus amount def to the image shift amount shft1 at the predetermined imaging plane and the relationship of the pupil distance (Dep1+def) from the image forming plane to the distance Gaf1 between the gravitational center point at the front lens exit pupil plane and the distribution center of the pair of focus detection light fluxes.

$$shft1:def=Gaf1:(Dep1+def)$$

$$shft1=def\times Gaf1/(Dep1+def) \quad (8)$$

Likewise, the image shift amount shft2 is determined based upon the similarity (proportional relation) between the triangle assuming a base side length Gaf2 and a height (Dep2+def) and the triangle assuming abase side length shft2 and a height def. Namely, the relationship between the image shift amount shft2 and the defocus amount def can be determined based on proportional relation between the relationship of the defocus amount def to the image shift amount shft2 at the predetermined imaging plane and the relationship of the pupil distance (Dep2+def) from the image forming plane to the distance Gaf2 between the gravitational center point at the front lens exit pupil plane and the distribution center of the pair of focus detection light fluxes.

$$shft2:def=Gaf2:(Dep2+def)$$

$$shft2=def\times Gaf2/(Dep2+def) \quad (9)$$

By incorporating expressions (8) and (9), the overall image shift amount shft can be expressed as below.

$$shft=shft1+shft2=def\times Gaf1/(Dep1+def)+def\times Gaf2/(Dep2+def) \quad (10)$$

Conditions imposed upon def<<Dep1, Dep2;

In a state close to the focus match state, the defocus amount def is determined through approximation, as expressed in (11) by modifying expression (10).

$$def=shft\times Dep1\times Dep2/(Gaf1\times Dep2+Gaf2\times Dep1) \quad (11)$$

When the defocus amount def is significant relative to Dep1 and Dep2, and thus cannot be disregarded (when a great extent of blurring manifests), the defocus amount def is determined as a solution to the quadratic expression in (12) below.

$$shft\times def2+(shft\times Dep1+shft\times Dep2-Gaf1-Gaf2)\times def+shft\times Dep1\times Dep2=0 \quad (12)$$

Figure 15:
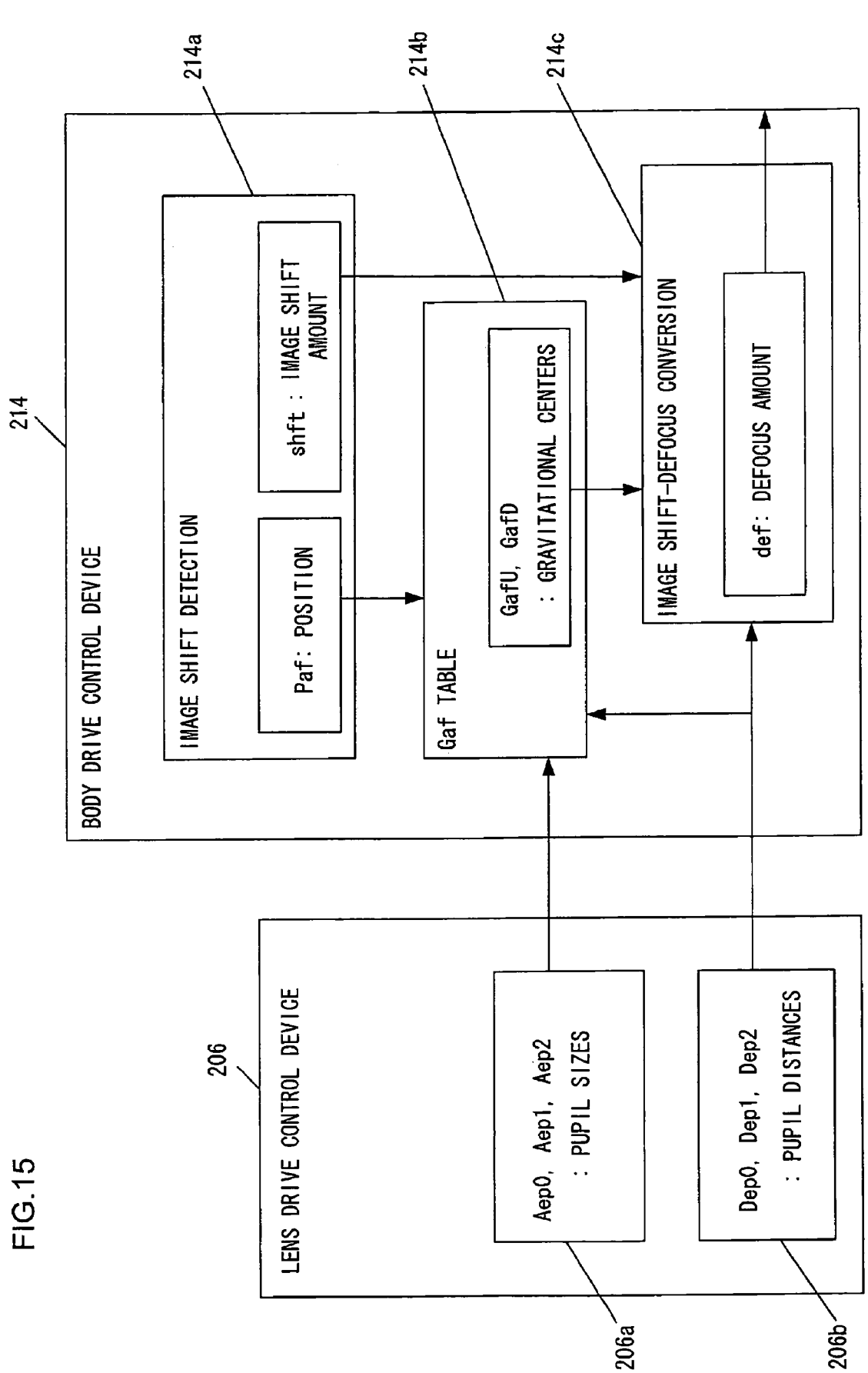
FIG. 15 is a block diagram of the conversion processing executed to convert the image shift amount to the defocus amount.
Figure 16:
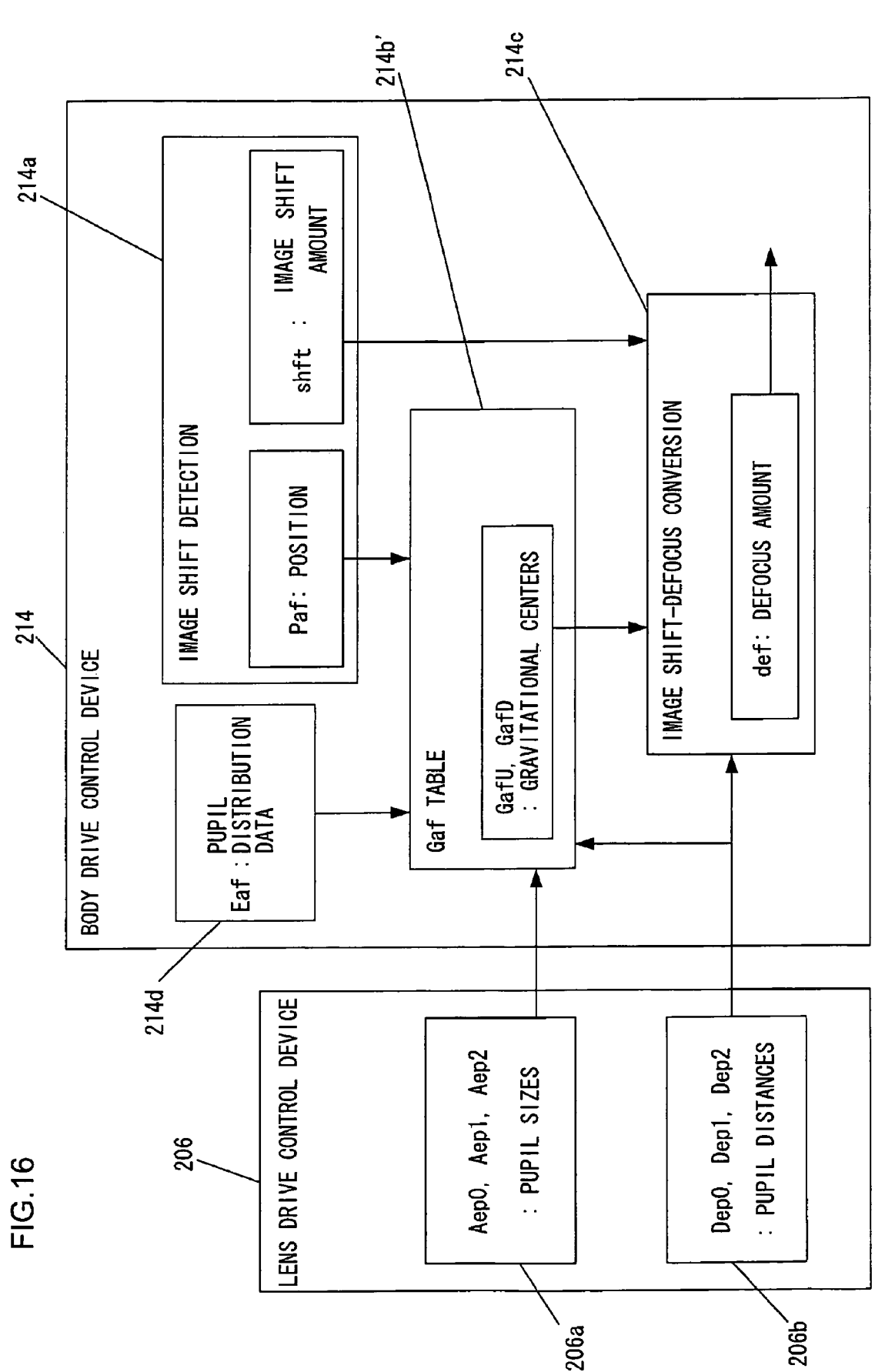
FIG. 16 is a block diagram of the conversion processing executed to convert the image shift amount to the defocus amount in a variation.

FIG. 15 is a block diagram illustrating the conversion processing executed to convert the image shift amount to the defocus amount. In line with the earlier explanation, the conversion processing executed to convert the image shift amount to the defocus amount is described next. A table (Gaf table) 214b for the center position of gravity pupil for focus detection stored in advance in the memory (not shown) of the body drive control device 214 is a table of three-dimensional gravitational center data of the pupil for focus detection (data indicating distances between the center points of gravity, e.g., Gaf1 and Gaf2, and the straight line 96) which are obtained through arithmetic processing executed by using the pupil distances (distance information), the pupil sizes (dimensional information) and the position of the focus detection point (positional information) as parameters. The body drive control device 214 receives exit pupil size data 206a and exit pupil distance data 206b stored in advance in the memory (not shown) in the lens drive control device 206. Then, based upon focus detection point data (Paf) 214a, the exit pupil size data 206a and the exit pupil distance data 206b, the body drive control device 214 makes a decision as to the specific primary exit pupil opening at which each of the pair of focus detection light fluxes is largely vignetted. Then, the body drive control device 214 extracts gravitational center data GafU and GafD corresponding to the pair of focus detection light fluxes from the table 214b for the center position of gravity the pupil for focus detection based upon the pupil size data 206a and the pupil distance data 206b for the particular exit pupil opening and the focus detection point data 214a.

An image shift amount-defocus conversion block 214c converts the image shift amount shft to the defocus amount def as expressed in (11) or (12) by using the exit pupil distance data 206b for the primary exit pupil openings at which the pair of focus detection light fluxes are largely restricted, included in the exit pupil distance data 206b having been received from the lens drive control device 206, and the gravitational center data GafU and GafD having been obtained from the table 206b for the center position of gravity the pupil for focus detection. It is to be noted that an image shift detection block 214a and the image shift amount-defocus conversion block 214c are both constituted by assuming a specific software configuration in the microcomputer (not shown) in the body drive control device 214.

VARIATIONS OF THE EMBODIMENT OF THE PRESENT INVENTION

If the pair of focus detection light fluxes are largely restricted at a single exit pupil opening and the focus detection point is near the image plane center (GafU=GafD=Gaf/2, Dep1=Dep2=Dep), the image shift amount shft may be approximated as expressed below.

$$shft=shft1+shft2=def\times Gaf/(Dep+def) \quad (13)$$

By modifying expression (13), the defocus amount def can be calculated as expressed below.

$$def=Dep\times shft/(Gaf-shft) \quad (14)$$

This means that as long as the pair of focus detection light fluxes are largely restricted at a single exit pupil opening and a focus detection point near the image plane center has been selected, the image shift amount may be converted to the defocus amount as expressed in (12).

An explanation is given above by assuming that the gravitational center data Gaf1 and Gaf2 in expressions (8) through (12) indicate the distances between the reference point (distribution center of the pair of focus detection light fluxes=intersection at which the straight line 96 and the pupil plane intersect each other in FIG. 14) and the position of the center point of gravity in the pair of focus detection light fluxes. However, geometric logic allows a point present on a straight line drawn from the focus detection point toward the pair of focus detection light fluxes to be used as the reference point, as well.

If the microcomputer constituting the body drive control device 214 has a high level of arithmetic processing capability, the table 214b for the center position of gravity of the pupil for focus detection in FIG. 15 may be replaced by a gravitational center data of the pupil for focus detection calculation block 214b', which directly obtains the gravitational center data GafU and GafD of the pupil for focus detection through arithmetic operation based upon pupil distribution data (basic pupil distribution data C1 and C2 in FIG. 13A-2) 214d, the pupil size data 206a and the pupil distance data 206b for the exit pupil openings at which vignetting has manifested and the focus detection point data 214a. It is to be noted that the image shift detection block 214a, the center data of gravity of the pupil for focus detection calculation block 214*b*' and the image shift amount-defocus amount conversion block 214*c* are all constituted by assuming a specific software configuration in the microcomputer (not shown) in the body drive control device 214. In addition, the pupil distribution data 214*d* are stored in advance in the memory (not shown) in the body drive control device 214.

The data in the table 214*b* correspond only to discrete values assumed by the input parameters and, for this reason, an error may occur in the gravitational center data GafU and GafD of the pupil for focus detection obtained by using the table 214*b*, if the actual data assume a value between discrete values. In addition, an error may occur in the gravitational center data GafU and GafD of the pupil for focus detection obtained by using the table 214*b* for the gravitational center data of the pupil for focus detection relative to the actual gravitational center data GafU and GafD of the pupil for focus detection, due to, for instance, nonuniformity among individual image sensors equipped with the focus detection pixels or environment-related variances such as the temperature or the humidity. Under such circumstances, the gravitational center data GafU and GafD of the pupil for focus detection may be corrected by using fixed correction values individually provided in correspondence to the individual gravitational center data GafU and GafD of the pupil for focus detection or the gravitational center data of the pupil for focus detection may be calibrated by feeding back the lens drive error having been ascertained through actual measurement, as shown in FIG. 17.

Figure 17:
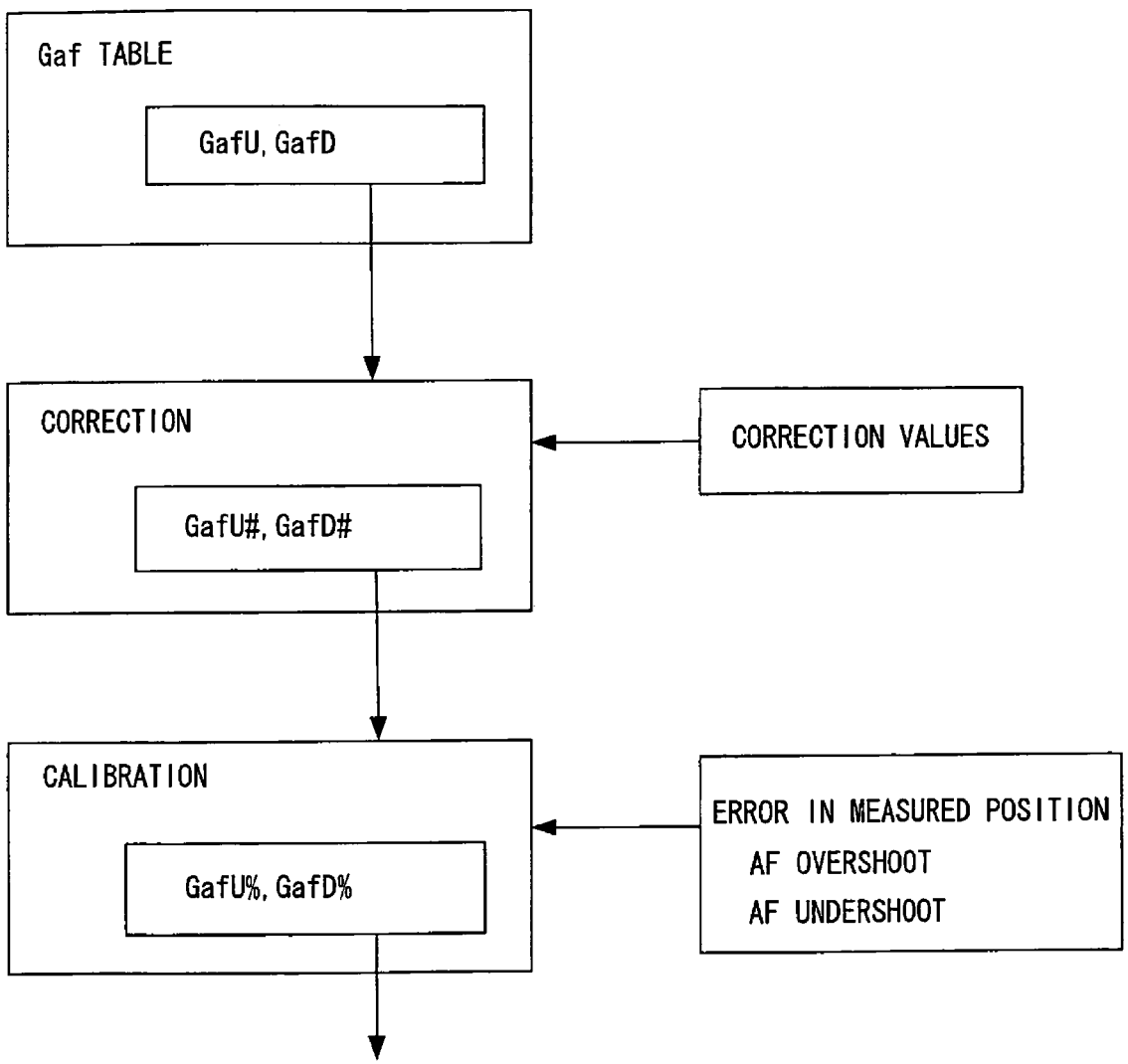
FIG. 17 presents an example in which the gravitational center data of the pupil for focus detection are corrected by using individual correction values assuming fixed values or based upon the individual lens drive error.
Figure 18:
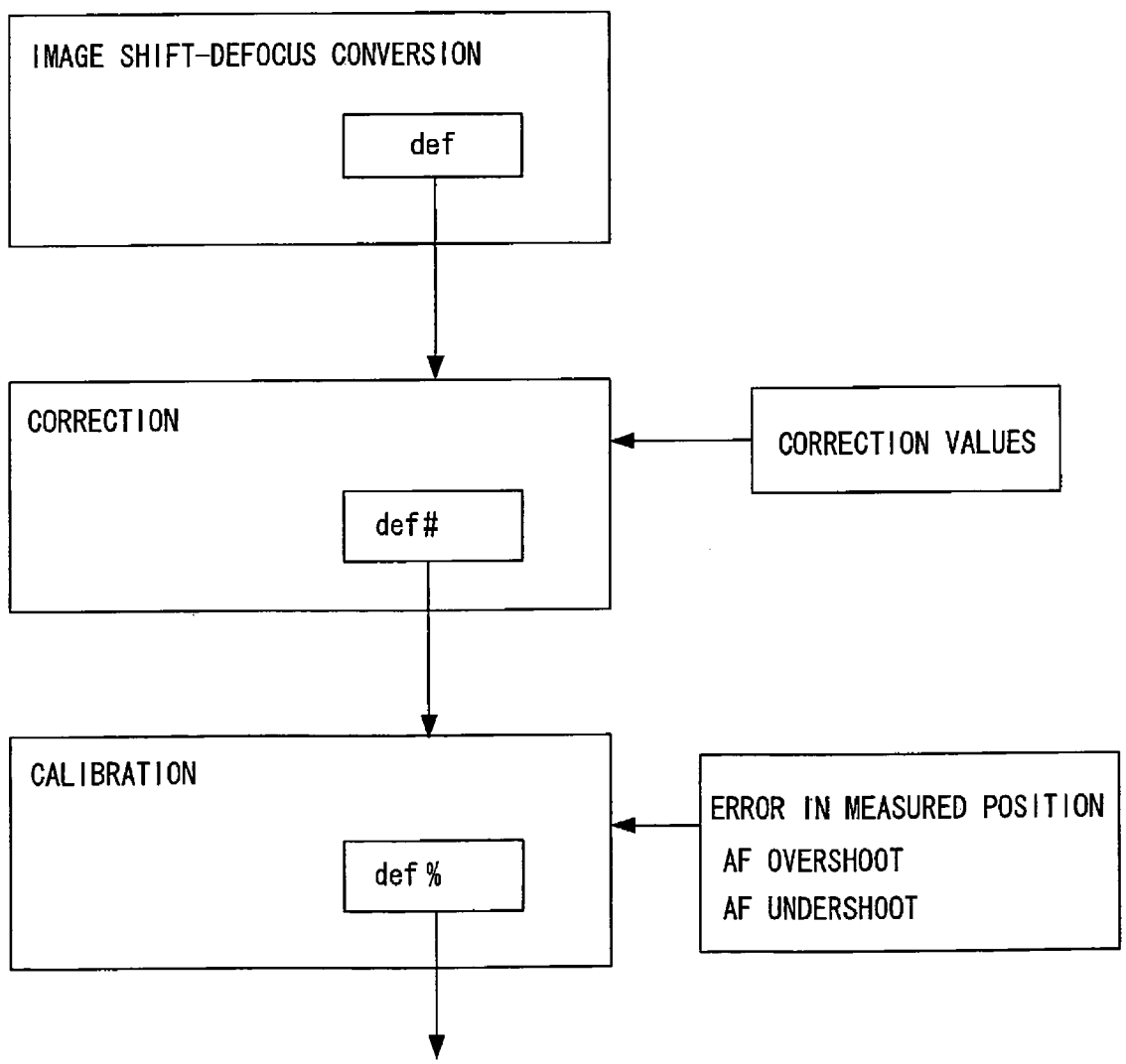
FIG. 18 presents an example in which the defocus amount is corrected by using individual correction values assuming fixed values or based upon the individual lens drive error.

In the example presented in FIG. 17, the gravitational center data GafU and GafD of the pupil for focus detection obtained from the table for the gravitational center data of the pupil for focus detection are first corrected by using the correction values, thereby obtaining corrected gravitational center data (GafU# and GafD#) of the pupil for focus detection. Then, based upon the defocus amount detected after driving the lens through automatic focal adjustment, a decision is made as to whether the lens has been driven beyond the correct focus point or only to a point short of the correct focus point. Next, based upon the error of the measured lens position indicated in the decision-making results, the corrected gravitational center data (GafU# and GafD#) of the pupil for focus detection are calibrated to gravitational center data (GafU % and GafD %) of the pupil for focus detection. Namely, if the lens has been driven beyond the correct focus point, the distance between the gravitational centers of the pupil for focus detection is increased, whereas if the lens has been driven only to a point short of the correct focus point, the distance between the gravitational centers of the pupil for focus detection is reduced. The correction and the calibration described above may be executed in correspondence to the specific level of defocusing indicated by the defocus amount, as shown in FIG. 18, instead.

Figure 19:
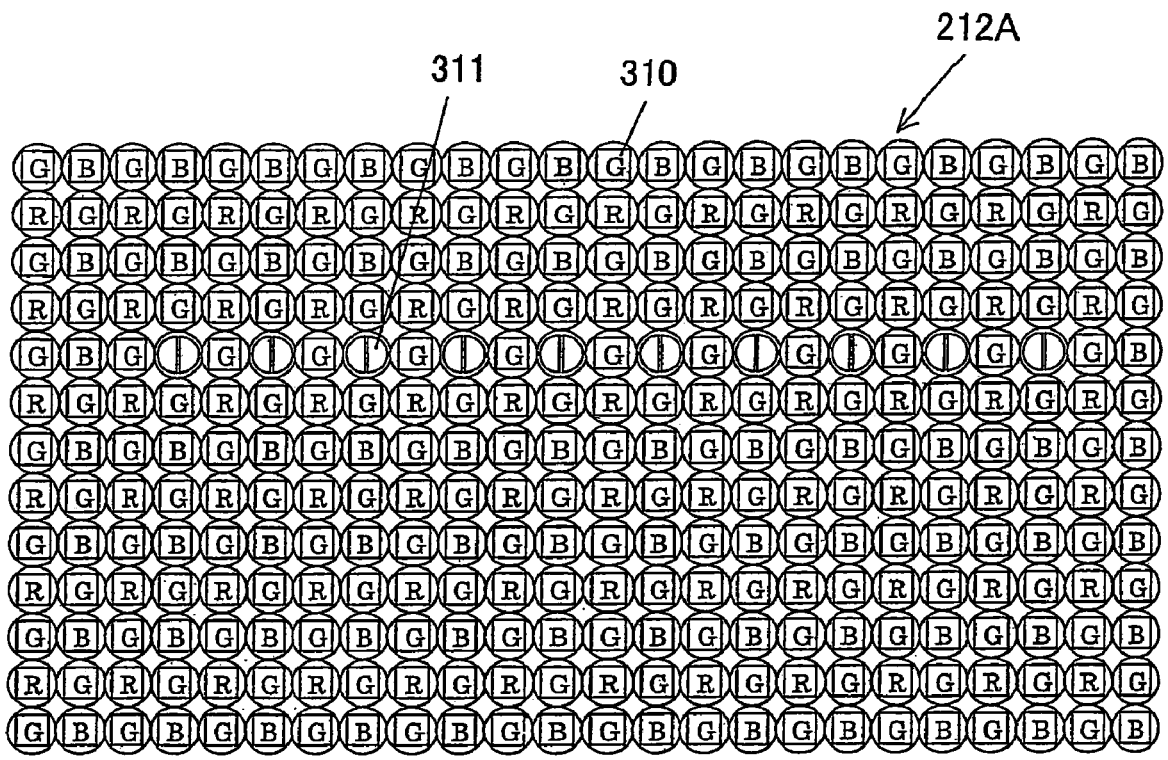
FIG. 19 is a front view showing in detail the structure adopted in an image sensor achieved as a variation of the embodiment.

While the image sensor 212 in the embodiment shown in FIG. 3 includes the focus detection pixels 311 disposed without allowing any interval between them, the focus detection pixels 311 may be disposed in a single row at alternate pixel positions that would otherwise be taken up by blue pixels as in an image sensor 212A shown in FIG. 19. While the focus detection accuracy is somewhat lowered when the arraying pitch with which the focus detection pixels are disposed is increased, the quality of the image resulting from the correction is improved since the focus detection pixels are set at lower density.

Figure 20:
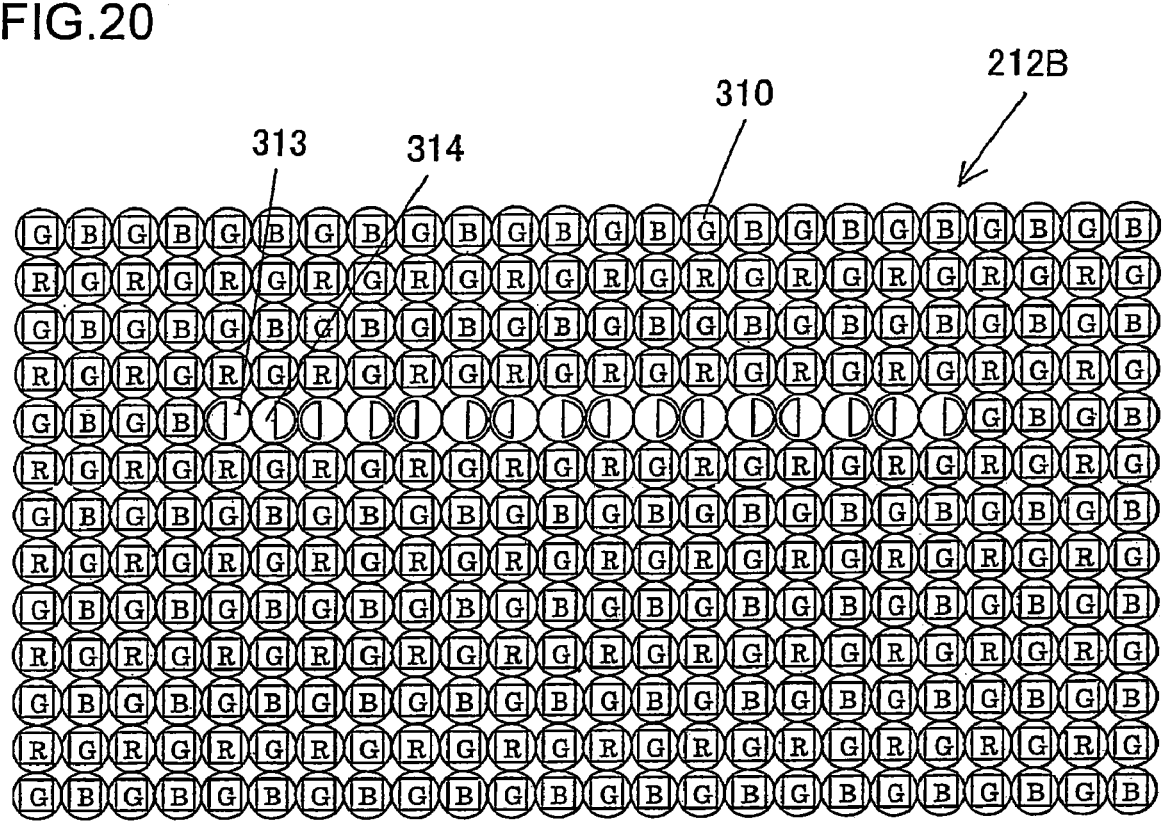
FIG. 20 is a front view showing in detail the structure adopted in an image sensor achieved as another variation of the embodiment.

While each focus detection pixel 311 in the image sensor 212 achieved in the embodiment in FIG. 3 includes a pair of photoelectric conversion units, a single photoelectric conversion unit may be disposed in each of focus detection pixels 313 and 314, as in an image sensor 212B shown in FIG. 20. In the image sensor in FIG. 20, a focus detection pixel 313 and the focus detection pixel 314 disposed next to the focus detection pixel 313 make up a pair and the pair of focus detection pixels is equivalent to a single focus detection pixel 311 in FIG. 3.

Figure 21A:
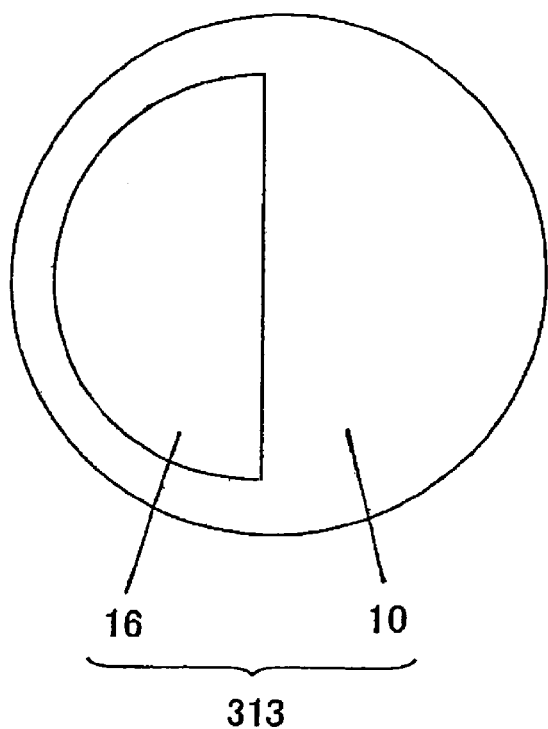
FIGS. 21A and 21B are front views of focus detection pixels in the image sensor shown in FIG. 20.
Figure 21B:
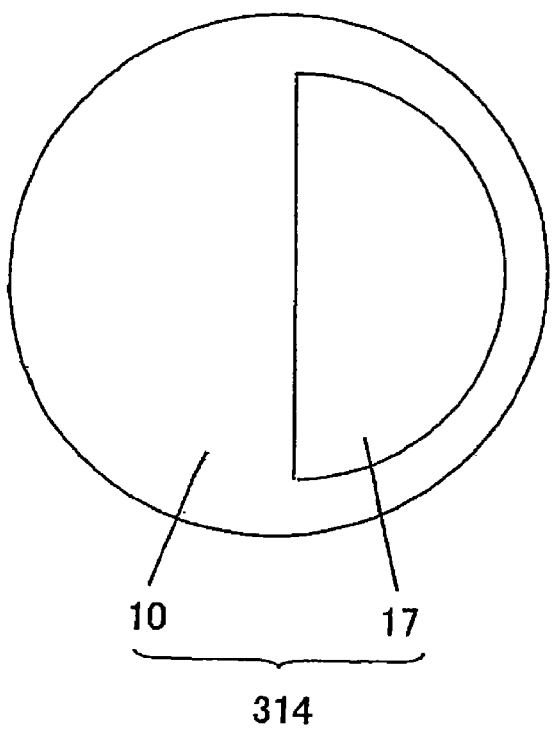

As shown in FIG. 21A, each focus detection pixel 313 is constituted with a micro-lens 10 and a photoelectric conversion unit 16. As shown in FIG. 21B, the focus detection pixels 314 are each constituted with a micro-lens 10 and a photoelectric conversion unit 17. The photoelectric conversion units 16 and 17 are projected onto the exit pupil of the interchangeable lens 202 via the micro-lenses 10 to define the pupils 92 and 93 for focus detection in FIG. 10. As a result, the pairs of image outputs to be used for focus detection can be obtained from the focus detection pixels 313 and 314. With a single photo electric conversion unit disposed in each focus detection pixel, it is ensured that the structure of the image sensor read circuit that reads out the data at the image sensor 212*b* does not become complicated.

While the imaging pixels in the image sensor 212 shown in FIG. 3 is equipped with color filters assuming a Bayer array, color filters adopting a structure and an array other than those shown in the figures may be used in conjunction with the present invention. For instance, an image sensor that includes complementary color filters, i.e., G (green) filters, Ye (yellow) filters, Mg (magenta) filters and Cy (cyan) filters, may be used. At this image sensor, the focus detection pixels should be disposed at pixel positions that would otherwise be occupied by imaging pixels equipped with cyan filters and magenta filters (i.e., imaging pixels equipped with color filters that contain a blue component with which the output error is relatively unnoticeable).

While the focus detection pixels in the image sensor 212 shown in FIG. 3 are not equipped with color filters, the present invention may be adopted in conjunction with focus detection pixels equipped with color filters, the color of which matches one of the colors of the color filters at the imaging pixels (e.g., green filters).

While the photoelectric conversion units in the focus detection pixels shown in FIGS. 5, 21A and 21B each assume a circular shape or a semicircular shape, photoelectric conversion units assuming shapes other than these may be utilized. For instance, the photoelectric conversion units in the focus detection pixels may be elliptical, rectangular or polygonal.

While the image sensor 212 in FIG. 3 assumes a dense square grid array constituted with imaging pixels and focus detection pixels, it may instead adopt a dense hexagonal grid array.

The image sensors 212, 212A and 212B described above may each be constituted with a CCD image sensor or a CMOS image sensor.

Figure 22:
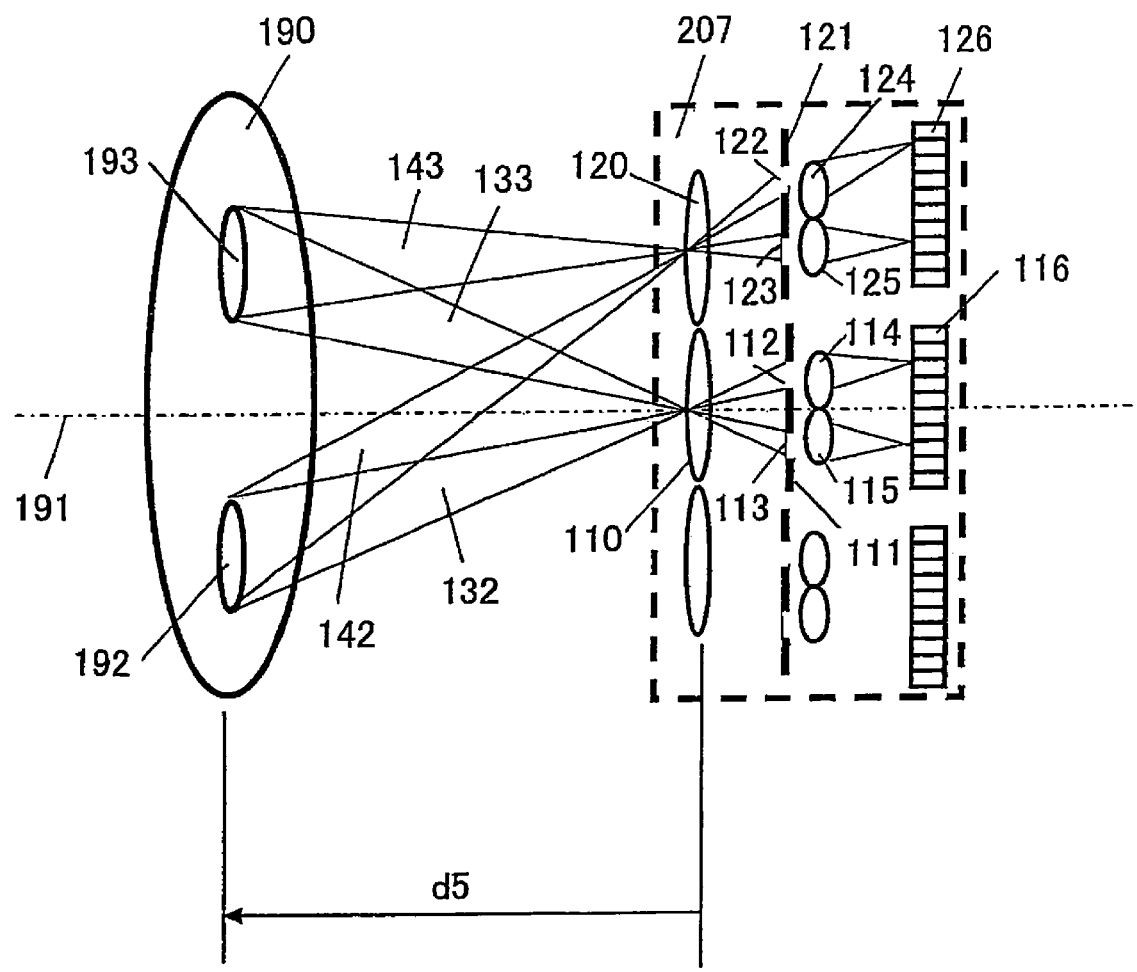
FIG. 22 shows the structure of a focus detection device adopting an image reforming split-pupil method.

In addition, the present invention is not limited to a focus detection device that executes focus detection via micro-lenses by adopting a split pupil method, and it may be adopted instead in a focus detection device adopting an image reforming split pupil method. In reference to FIG. 22, focus detection executed by adopting the image reforming split pupil method is described. In FIG. 22, reference numerals 191 indicates the optical axis of the interchangeable lens, reference numerals 110 and 120 each indicate a condenser lens, reference numerals 111 and 121 each indicate an aperture mask, reference numerals 112, 113, 122 and 123 each indicate an aperture opening, reference numerals 114, 115, 124 and 125 each indicate an image reforming lens and reference numerals 116 and 126 each indicate a focus detection image sensor (CCD).

In addition, reference numerals 132, 133, 142 and 143 each indicate a focus detection light flux and reference numeral 190 indicates an exit pupil set over a distance d5 further to the front relative to the predetermined imaging plane of the interchangeable lens 202. The distance d5, which is determined in correspondence to the focal lengths of the condenser lenses 110 and 120, the distances to the aperture openings 112, 113, 122 and 123 from the condenser lenses 110 and 120 and the like, is referred to as a distance to a pupil for focus detection in the description. Reference numeral 192 indicates an area (pupil for focus detection) defined by the aperture openings 112 and 122 projected via the condenser lenses 110 and 120, whereas reference numeral 193 indicates an area (pupil for focus detection) defined by the aperture openings 113 and 123 projected via the condenser lenses 110 and 120. The condenser lens 110, the aperture mask 111, the aperture openings 112 and 113, the image reforming lenses 114 and 115 and the image sensor 116 constituted a focus detection unit that executes focus detection through split pupil phase difference detection at a given point by adopting the image reforming method.

FIG. 22 schematically illustrates a focus detection unit present on the optical axis 191 and a focus detection unit present off the optical axis. By using a plurality of focus detection units in combination, a dedicated focus detection sensor capable of executing focus detection through split pupil phase difference detection adopting the image reforming method at three different focus detection points, as indicated by 101 through 105 in FIG. 2, can be realized.

The focus detection unit that includes the condenser lens 110 comprises the condenser lens 110 disposed near the predetermined imaging plane of the imaging optical system 202, the image sensor 116 disposed to the rear of the condenser lens, the pair of image reforming lenses 114 and 115 disposed between the condenser lens 110 and the image sensor 116 to reform a primary image having been formed near the predetermined imaging plane onto the image sensor 116 and the aperture mask 111 that includes the pair of aperture openings 112 and 113 disposed near the pair of image reforming lenses (to the front of the lenses in the figure).

The image sensor 116 is a line sensor constituted with a plurality of photoelectric conversion units densely disposed along a straight line. The photoelectric conversion units in the image sensor 116 are disposed along a direction matching the direction along which the pair of pupils for focus detection are separated from each other (the direction along which the aperture openings are set side-by-side). Information corresponding to the intensity distributions in the pair of images reformed on the image sensor 116 is output from the image sensor 116. Through the image shift detection arithmetic processing (correlation processing, phase difference detection processing) executed on the information as described earlier, the image shift amount indicating the extent of shift of the pair of images is detected through the split pupil phase difference detection method (image reforming method). The image shift amount then undergoes the conversion processing explained earlier so as to calculate the extent of deviation (the defocus amount) of the current image forming plane relative to the predetermined imaging plane.

The image sensor 116 is projected onto the predetermined imaging plane via the image reforming lenses 114 and 115, and the accuracy with which the defocus amount (image shift amount) is detected is determined in correspondence to the image shift amount detection pitch (the pitch at which the photoelectric conversion units, projected onto the predetermined imaging plane, are disposed in the case of detection executed by adopting the image reforming method).

The aperture openings 112 and 113 at the aperture mask 111 are projected via the condenser lens 110 onto the exit pupil 190, defining the areas 192 and 193. The areas 192 and 193 are referred to as pupils for focus detection. Namely, the pair of images reformed on the image sensor 116 are formed with light fluxes passing through the pair of pupils for focus detection 192 and 193 on the exit pupil 190. The light fluxes 132 and 133 passing through the pair of pupils 192 and 193 for focus detection on the exit pupil 190 are referred to as focus detection light fluxes.

Through the focus detection adopting the image reforming split-pupil method described above, too, the image shift amount can be accurately converted to a defocus amount by adopting the present invention when the pair of focus detection light fluxes are restricted by a component (the aperture, a lens, etc.) in the photographic lens.

The present invention may also be adopted when focus detection areas are set only at points on the optical axis in the photographic image plane 100. In such a case, the body drive control device 214 is able to convert the image shift amount to the defocus amount without having to use the focus detection point data (Paf).

The imaging apparatus according to the present invention may be embodied as an apparatus other than a digital still camera or a film still camera with an interchangeable lens mounted at the camera body. The present invention may also be adopted in a digital still camera or a film still camera with an integrated lens. It may also be adopted in a compact camera module built into a portable telephone or the like, a surveillance camera or the like, as well. The present invention may be further adopted in a focus detection device installed in a device other than a camera, a device for focus detection or a stereo device for focus detection. Furthermore, the present invention may be adopted in a device that detects the displacement of the subject image or vibration of the camera by detecting the correlation between image sensor signals output at different time points. In addition, the present invention may be adopted in pattern matching executed for an image signal output from an image sensor and a specific image signal. Moreover, the present invention may be adopted to detect the correlation between two sets of audio data or the correlation between two signals of any other type, instead of in the detection of the correlation between two sets of image signal data.

The above described embodiment is an example and various modifications can be made without departing from the scope of invention.

What is claimed is:

1. A focus detection device, comprising:
   an image shift detection unit that detects a relative shift amount of a pair of images formed by a pair of light fluxes having passed through an optical system;
   a conversion unit that converts the shift amount to a defocus amount based upon dimensional information of an exit pupil corresponding to an aperture restricting light flux in the optical system and distance information of the exit pupil indicating distance to the exit pupil from a predetermined imaging plane of the optical system;
   a gravitational center information output unit that outputs a center position of gravity of at least one of the light fluxes in the pair of light fluxes included in the light flux restricted by the exit pupil on a plane on which the exit pupil is set, based upon the dimensional information and the distance information of the exit pupil;

a detection point positional information output unit that outputs positional information indicating a position of the detection point at which the defocus amount is detected; and a light quantity distribution information output unit that outputs light quantity distribution information indicating light quantity distributions in at least one of the light fluxes on the plane on which the exit pupil is set, wherein:
the conversion unit converts the shift amount to the defocus amount based upon the distance information of the exit pupil and the center position of gravity, and the gravitational center information output unit outputs a center position of gravity of at least one of the light fluxes in the pair of the light fluxes included in the light flux restricted by the exit pupil on a plane on which the exit pupil is set, based upon the distance information of the exit pupil, the dimensional information of the exit pupil, the positional information, and the light quantity distribution information.

2. A focus detection device according to claim 1, wherein:
the gravitational center information output unit outputs the center position of gravity information in correspondence to each pair of light fluxes; and
the conversion unit converts a sum of the shift amount to the defocus amount, the sum of the shift amount being calculated in correspondence to each pair of light fluxes based upon the center position of gravity information and the distance information of the exit pupil.

3. A focus detection device according to claim 1 wherein:
the conversion unit converts the shift amount to the defocus amount based upon a proportional relation between the defocus amount relative to the shift amount at the predetermined imaging plane and a distance from an image forming plane to the plane on which the exit pupil is set relative to a distance from the center position of gravity at the plane on which the exit pupil is set to a center position of distribution of the pair of light fluxes.

4. A focus detection device according to claim 1, wherein:
a dimension of the aperture in the optical system is defined by an aperture stop diameter, a lens diameter and an inner diameter of a lens holding member.

5. A focus detection device according to claim 1, wherein:
the gravitational center information output unit outputs the center position of gravity in correspondence to each image shift detection unit.

6. A focus detection device according to claim 1 further comprising:
an error detection unit that detects an error manifested with regard to the defocus amount based on a defocus amount provided by the conversion unit through conversion executed after driving the optical system based upon the defocus amount, wherein:
the gravitational center information output unit outputs the center position of gravity corrected in correspondence to the error.

7. A focus detection device according to claim 1, wherein:
the image shift detection unit includes an array of focus detection pixels each equipped with a minute optical element and a photoelectric conversion unit disposed rearward relative to the minute optical element and detects the shift amount based upon an output from the focus detection pixels.

8. An imaging apparatus comprising a focus detection device according to claim 1.

9. A focus detection device, comprising:
an image shift detection unit that detects a relative shift amount of a pair of images formed by a pair of light fluxes having passed through an optical system;
a conversion unit that converts the shift amount to a defocus amount based upon dimensional information of an exit pupil corresponding to an aperture restricting light flux in the optical system and distance information of the exit pupil indicating distance to the exit pupil from a predetermined imaging plane of the optical system;
a gravitational center information output unit that outputs a center position of gravity of at least one of the light fluxes in the pair of light fluxes included in the light flux restricted by the exit pupil on a plane on which the exit pupil is set, based upon the dimensional information and the distance information of the exit pupil; and
an error detection unit that detects an error manifested with regard to the defocus amount based on a defocus amount provided by the conversion unit through conversion executed after driving the optical system based upon the defocus amount, wherein:
the conversion unit converts the shift amount to the defocus amount based upon the distance information of the exit pupil and the center position of gravity, and
the gravitational center information output unit outputs the center position of gravity corrected in correspondence to the error;
the image shift detection unit generates a pair of signal data strings constituted with a first signal data string and a second signal data string from the output from the focus detection pixels;
the image shift detection unit generates first arithmetic operation data by multiplying first data in the first signal data string by data samples near second data in the second signal data string corresponding to the first data and generates second arithmetic operation data by multiplying the second data in the second signal data string by data sampled near the first data in the first signal data string; and
the image shift detection unit detects the shift amount by determining through arithmetic operation a level of correlation between the first arithmetic operation data and the second arithmetic operation data.

10. A focus detection method, comprising:
detecting a relative shift amount of a pair of images formed by a pair of light fluxes having passed through an optical system;
converting the shift amount to a defocus amount based upon a dimensional information of exit pupil corresponding to an aperture restricting light flux in the optical system and distance information of the exit pupil from a predetermined imaging plane of the optical system;
outputting a center position of gravity of at least one of the light fluxes in the pair of light fluxes included in the light flux restricted by the exit pupil on a plane on which the exit pupil is set is output, based upon the dimensional information and the distance information of the exit pupil;
outputting a detection point positional information indicating a position of detection point at which the defocus amount is detected; and
outputting light quantity distribution information indicating light quantity distributions of the light fluxes on the plane on which the exit pupil is set, wherein:
the shift amount determined based upon the center position of gravity and the distance information of the exit pupil is converted to the defocus amount in a step of converting the image shift amount to the defocus amount, and a center position of gravity of at least one of the light fluxes in the pair of light fluxes included in the light flux restricted by the exit pupil on a plane on which the exit pupil is set is output, based upon the dimensional information of the exit pupil, the distance information of the exit pupil, the position information and the light quantity distribution information in a step of outputting the center position of gravity.

11. A focus detection method according to claim 10, wherein:

the center position of gravity information is output in correspondence to each pair of light fluxes in a step of outputting the center position of gravity; and a sum of the shift amount is converted to the defocus amount in a step of converting the shift amount to the defocus amount, the sum of the shift amount being calculated in correspondence to each pair of light fluxes based upon the center position of gravity information and the distance information of the exit pupil.

12. A focus detection method according to claim 10, wherein:

the shift amount is converted to the defocus amount based upon a proportional relation between the defocus amount relative to the shift amount at the predetermined imaging plane and a distance from an image forming plane to the plane on which the exit pupil is set relative to a distance from the center position of gravity at the plane on which the exit pupil is set to a center position of distribution of the pair of light fluxes in a step of converting the shift amount to the defocus amount.

13. A focus detection method according to claim 10, further comprising:

outputting position information indicating a position at which the defocus amount is detected, wherein:

outputting a center position of gravity of at least one of the light fluxes in the pair of light fluxes included in the light flux restricted by the exit pupil on a plane on which the exit pupil is set based upon the dimensional information, the distance information and the position information in a step of outputting the center position of gravity.

14. A focus detection method according to claim 10, further comprising:

outputting light quantity distribution information indicating light quantity distributions of the light fluxes on the plane on which the exit pupil is set, wherein:

a center position of gravity of at least one of the light fluxes in the pair of light fluxes included in the light flux restricted by the exit pupil on a plane on which the exit pupil is set is output, based upon the dimensional information of the exit pupil, the distance information of the exit pupil and the light quantity distribution information in a step of outputting the center position of gravity.

15. A focus detection device, comprising:

an image shift detection unit that detects a relative shift amount of a pair of images formed by a pair of light fluxes having passed through an optical system;

a gravitational center information output unit that outputs a pair of center positions of gravity of the light fluxes in the pair of light fluxes included in the light flux restricted by the exit pupil on a plane on which the exit pupil is set, based upon a dimensional size of the exit pupil corresponding to an aperture restricting light flux in the optical system;

an exit pupil distance to the exit pupil from a predetermined imaging plane of the optical system;

a position on a predetermined plane at which the image shift detection unit detects the relative shift amount;

light quantity distributions of light fluxed on the plane on which the exit pupil is set; and a conversion unit that converts the shift amount to a defocus amount of the optical system as a ratio of a sum of the exit pupil distance and the defocus to the interval of the pair of center position of gravity equals to a ratio of the defocus amount to the shift amount.

* * * * *